United States Patent
Galimberti et al.

(10) Patent No.: US 12,453,900 B1
(45) Date of Patent: Oct. 28, 2025

(54) SYSTEM AND METHOD FOR CONDUCTING TRAINING SESSIONS

(71) Applicant: VIXON LLC, Pembroke Pines, FL (US)

(72) Inventors: Agostina Galimberti, Port Saint Lucie, FL (US); Paulo Suarez Perez, Port Saint Lucie, FL (US)

(73) Assignee: VIXON LLC, Pembroke Pines, FL (US)

( * ) Notice: Subject to any disclaimer, the term of this patent is extended or adjusted under 35 U.S.C. 154(b) by 0 days.

(21) Appl. No.: 18/921,249

(22) Filed: Oct. 21, 2024

(51) Int. Cl.
A63B 24/00 (2006.01)
A63B 71/06 (2006.01)
G06F 3/04817 (2022.01)
G06F 3/0482 (2013.01)

(52) U.S. Cl.
CPC ...... *A63B 24/0084* (2013.01); *A63B 71/0622* (2013.01); *G06F 3/04817* (2013.01); *G06F 3/0482* (2013.01); *A63B 2071/0625* (2013.01); *A63B 2071/0655* (2013.01); *A63B 2214/00* (2020.08); *A63B 2225/50* (2013.01); *A63B 2225/74* (2020.08)

(58) Field of Classification Search
CPC ............ A63B 24/0084; A63B 71/0622; A63B 2225/74; A63B 2214/00; A63B 2071/0625; A63B 2071/0655; A63B 2225/50; G06F 3/04817; G06F 3/0482
See application file for complete search history.

(56) References Cited

U.S. PATENT DOCUMENTS

| | | | |
|---|---|---|---|
| 6,336,876 B1* | 1/2002 | Moore | A63B 43/04 273/348.2 |
| 8,502,480 B1* | 8/2013 | Gerszberg | H05B 47/1965 315/318 |
| 9,317,660 B2* | 4/2016 | Burich | A61B 5/1118 |
| 9,345,948 B2* | 5/2016 | Martin | G06Q 10/06 |
| 9,849,361 B2* | 12/2017 | Coza | G16H 40/60 |
| 10,441,875 B2* | 10/2019 | King | F21V 23/0435 |
| 10,628,770 B2* | 4/2020 | Horseman | G16H 50/30 |
| 10,886,017 B2* | 1/2021 | Aihara | A61B 5/6801 |
| 11,148,032 B2* | 10/2021 | Henning | G16H 20/30 |
| 11,389,717 B2* | 7/2022 | King | A63F 9/24 |
| 11,879,625 B1* | 1/2024 | Safar | G06F 3/0362 |

(Continued)

*Primary Examiner* — Malina D. Blaise
(74) *Attorney, Agent, or Firm* — Sagacity Legal PLLC

(57) ABSTRACT

A system for conducting a training session for a plurality of players comprises a training device, a hub network device, and wearable devices. The training device displays icons representing players associated with the wearable devices. The training device creates a plurality of virtual teams based on the selection of the players and associates the virtual teams with different colors. In addition, the training device transmits signals to illuminate visual indicators of the wearable devices of the players in each virtual team with respective associated colors to indicate commencement of different predefined activities. Furthermore, the training device also associates at least one icon representing at least one player with a different color from a previously associated color and transmits a signal to at least one wearable device corresponding to the player to illuminate the visual indicator of the wearable device in the different color to indicate commencement of a different predefined activity by the player.

20 Claims, 15 Drawing Sheets

(56) References Cited

U.S. PATENT DOCUMENTS

| | | | | |
|---|---|---|---|---|
| 2002/0083507 A1* | 7/2002 | Mullis | ............... | A41D 13/01 |
| | | | | 2/94 |
| 2004/0158911 A1* | 8/2004 | Amnuel | ............... | A41D 27/08 |
| | | | | 2/115 |
| 2007/0213126 A1* | 9/2007 | Deutsch | ............... | A63B 71/03 |
| | | | | 473/422 |
| 2009/0005196 A1* | 1/2009 | Kessler | ............... | A63B 63/00 |
| | | | | 473/476 |
| 2012/0253484 A1* | 10/2012 | Burich | ............... | A63B 71/06 |
| | | | | 700/91 |
| 2019/0166933 A1* | 6/2019 | Tiffin | ............... | A41D 19/0013 |
| 2019/0220636 A1* | 7/2019 | Yeh | ............... | G06K 7/10366 |
| 2021/0315289 A1* | 10/2021 | Watson | ............... | B60Q 1/381 |
| 2021/0388979 A1* | 12/2021 | Maderic | ............... | H05B 47/19 |
| 2022/0034490 A1* | 2/2022 | Kearns | ............... | F21V 23/06 |
| 2023/0393541 A1* | 12/2023 | Tran | ............... | G06F 30/27 |

* cited by examiner

SYSTEM AND METHOD FOR CONDUCTING TRAINING SESSIONS

BACKGROUND OF THE INVENTION

To encourage team-play and team coordination, coaches often selectively segregate players into different teams and conduct training sessions. However, conducting such training sessions each time can become time consuming, monotonous, and predictable overtime. Moreover, performance, agility, and coordination skills of each individual player cannot improve by conducting similar type of training sessions repeatedly. Thus, it can be desirable for the coaches to make the training sessions more engaging for the players each time. It can also be desirable for the coaches to involve the players in different teams, situations, positions, and/or conditions, to evaluate the performance of the players. Such performance evaluations can also help coaches to better understand team dynamics and strategize game plans based on the team dynamics.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention and explain various principles and advantages of those embodiments.

Figure 1:
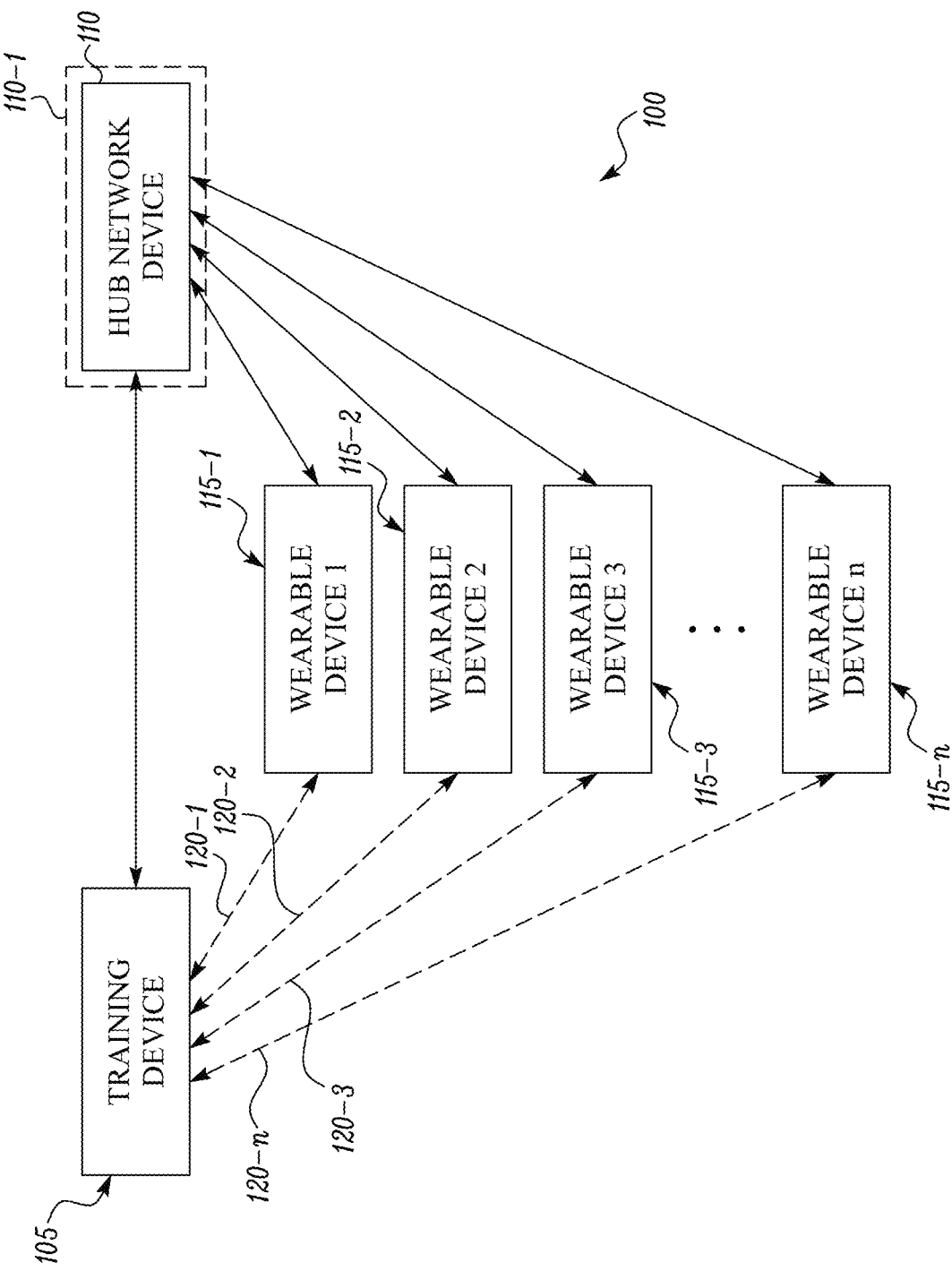
FIG. 1 illustrates an environment employing an exemplary system for conducting a training session for players, in accordance with some embodiments.

Skilled artisans will appreciate that elements in the figures are illustrated for simplicity and clarity and have not necessarily been drawn to scale. For example, the dimensions of some of the elements in the figures can be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

In one aspect, a system for conducting a training session for a plurality of players comprises a hub network device and a plurality of wearable devices correspondingly associated with the players. Each wearable device comprises a visual indicator. The system also comprises a training device associated with an instructor and in communication with the wearable devices via the hub network device. The training device is configured to display, via a user interface, a plurality of icons correspondingly representing the plurality of players associated with the wearable devices. The training device is also configured to create, via a processor of the training device, a first virtual team on the user interface based on a selection of a first subset of icons of the plurality of icons corresponding to a first subset of players of the plurality of players. The training device is also configured to create a second virtual team on the user interface based on a selection of a second subset of icons of the plurality of icons corresponding to a second subset of players of the plurality of players. The first subset of players is different from the second subset of players.

The training device is further configured to associate, via the processor, the first virtual team and the first subset of icons with a first color based on a selection of the first color via the user interface, and the second virtual team and the second subset of icons with the second color based on a selection of the second color via the user interface. In addition, the training device is configured to transmit, via the processor and the hub network device, a first signal to a first subset of wearable devices of the wearable devices corresponding to the first subset of players to illuminate the visual indicator of each of the first subset of wearable devices in the first color. The training device is also configured to transmit, via the processor and the hub network device, a second signal to a second subset of wearable devices of the wearable devices corresponding to the second subset of players to illuminate the visual indicator of each of the second subset of icons with the second color based on a selection of the second color via the user interface. The illumination of the visual indicator in the first color and the second color indicates commencement of a first predefined activity between the first subset of players and the second subset of players. Furthermore, the training device is configured to associate, via the processor, at least one icon of the plurality of icons corresponding to at least one player with a third color. The training device is also configured to transmit, via the processor and the hub network device, a third signal to at least one wearable device of the plurality of wearable devices corresponding to the player to illuminate the visual indicator of the wearable device in the third color. The illumination of the visual indicator in the third color indicates commencement of a second predefined activity by the player.

In another aspect, a method for conducting a training session for a plurality of players comprises displaying, via a user interface of a training device, a plurality of icons correspondingly representing the players associated with a plurality of wearable devices. The method also comprises creating, via a processor of the training device, a first virtual team on the user interface based on a selection of a first subset of icons of the plurality of icons corresponding to a first subset of players of the plurality of players, and a second virtual team on the user interface based on a selection of a second subset of icons of the plurality of icons corresponding to a second subset of players of the plurality of players. The first subset of players is different from the second subset of players.

The method further comprises associating, via the processor, the first virtual team and the first subset of icons with a first color based on a selection of the first color via the user interface, and the second virtual team and the second subset of icons with the second color based on a selection of the second color via the user interface. In addition, the method comprises transmitting, via the processor, a first signal to a first subset of wearable devices of the plurality of wearable devices corresponding to the first subset of players to illuminate the visual indicator of each of the first subset of wearable devices in the first color. The method also comprises transmitting a second signal to a second subset of wearable devices of the plurality of wearable devices corresponding to the second subset of players to illuminate the visual indicator of each of the second subset of wearable devices in the second color. The method also comprises illuminating the visual indicator of each of first subset of wearable devices and each of the second subset of wearable devices in the first color and the second color in response to first signal and second signal respectively to commence first predefined activity. Furthermore, the method comprises associating, via the processor, at least one icon of the plurality of icons corresponding to at least one player with a third color. The method also comprises transmitting, via the processor, a third signal to a wearable device corresponding to the player to illuminate the visual indicator of the wearable device in the third color. The illumination of the visual indicator in the third color indicates commencement of a second predefined activity by the player. Further, the method includes illuminating the visual indicator of at least one wearable device in the third color in response to the third signal to commence a second predefined activity during the first predefined activity.

In yet another aspect, a training device for conducting a training session for a plurality of players comprises a transceiver in communication with plurality of wearable devices correspondingly associated with the players via a hub network device. The training device also comprises a processor and a memory for storing instructions, that when executed by the processor, causes the processor to display, via a user interface, plurality of icons correspondingly representing the players associated with the wearable devices. The processor is also configured to create a first virtual team on the user interface based on a selection of a first subset of icons of the plurality of icons corresponding to a first subset of players of the plurality of players. The processor is also configured to create a second virtual team on the user interface based on a selection of a second subset of icons of the plurality of icons corresponding to a second subset of players of the plurality of players. The first subset of players is different from the second subset of players.

The processor is further configured to associate the first virtual team and the first subset of icons with a first color based on a selection of the first color via the user interface, and the second virtual team and the second subset of icons with the second color based on a selection of the second color via the user interface. In addition, the processor is configured to transmit, via the hub network device, a first signal to a first subset of wearable devices of the wearable devices corresponding to the first subset of players to illuminate the visual indicator of each of the first subset of wearable devices in the first color. The processor is also configured to transmit, via the hub network device, a second signal to a second subset of wearable devices of the wearable devices corresponding to the second subset of players to illuminate the visual indicator of each of the second subset of icons with the second color based on a selection of the second color via the user interface. The illumination of the visual indicator in the first color and the second color indicates commencement of a first predefined activity between the first subset of players and the second subset of players. Furthermore, the processor is configured to associate at least one icon of the plurality of icons corresponding to at least one player with a third color. The processor is also configured to transmit, via the hub network device, a third signal to at least one wearable device of the plurality of wearable devices corresponding to the player to illuminate the visual indicator of the wearable device in the third color. The illumination of the visual indicator in the third color indicates commencement of a second predefined activity by the player.

FIG. 1 illustrates an environment employing an exemplary system 100 for conducting a training session for players. The system 100 includes a training device 105 in communication with plurality of wearable devices, for example, 115-1, 115-2, 115-3 . . . 115-*n*, via a hub network device 110. In some embodiments, the training device 105 is configured to establish a direct communication with plurality of wearable devices, for example, 115-1, 115-2, 115-3 . . . 115-*n* via a direct or peer-to-peer communication network, for example, 120-1 . . . 120-*n* such as, but not limited to, a Wi-Fi Direct network. In an exemplary embodiment, the training device 105 is associated with an instructor or a coach managing the training sessions. In an exemplary embodiment, the plurality of wearable devices, for example, 115-1, 115-2, 115-3 . . . 115-*n*, are associated with the players. It will be appreciated by those of ordinary skill in the art that the training sessions, the instructors, coaches, and/or the players can be associated with any sport including, but not limited to, soccer, football, tennis, and basketball, or any activity including, but not limited to, exercising, and dancing. Examples of the training device 105 include, but are not limited to, computers, laptops, mobile devices, handheld devices, personal digital assistants (PDAs), tablet personal computers, digital notebook, wearables, and any other computing device now known or developed in the future. Examples of the wearable devices, for example, **115-1, 115-2, 115-3 . . . 115-*n*, include, but are not limited to, sport/smart watches, smart jewelry, smart clothing, fitness tracking devices, head-mounted displays, and implantable devices. In an exemplary embodiment, the wearable devices, for example, 115-1, 115-2, 115-3 . . . 115-*n*, correspond to smart clothing including, but not limited to, sports vests, jerseys, shirts, T-shirts, shorts, and pants. In accordance with various embodiments, the wearable devices, for example, 115-1 . . . 115-*n* include one or more visual indicators, for example, 220-1 . . . 220-*n* respectively. (See FIG. 2) Examples of the visual indicators, for example, 220-1 . . . 220-*n*** include, but are not limited to, Light Emitting Diodes (LED) lights, digital indicators, electronic visual displays, and/or any other light emitting or display device known now or in future developed.

The hub network device 110 corresponds to any network device, now known or developed in the future developed, configured for establishing a connection and a communication with or between various devices including, but not limited to, the training device 105 and the wearable devices, for example, **115-1, 115-2, 115-3 . . . 115-*n*, respectively via a hub network 110-1. Examples of the hub network 110-1 include, but are not limited to, a Local Area Network (LAN), a Wireless Local Area Network (WLAN), a Wireless Personal Area Network (WPAN) including, but not limited to, Bluetooth®, a Small Area Network (SAN), and a telecommunication network including, but not limited to, a fourth generation (4G) and a fifth generation (5G) cellular network. In various embodiments, the hub network device 110 can be configured to transmit a network communication signal to enable the connection with the devices, for example, the training device 105 and the wearable devices, for example, 115-1, 115-2, 115-3 . . . 115-*n*. As an example, the hub network device 110 can be a Bluetooth® based network device that is configured to be transmit a Bluetooth® signal and establish a connection with other Bluetooth® enabled devices including, but not limited to, the training device 105 and the wearable devices, for example, 115-1, 115-2, 115-3 . . . 115-*n*. Upon establishing connection with the hub network device 110, the training device 105 and/or the wearable devices, for example, 115-1, 115-2, 115-3 . . . 115-*n*, correspond to a "paired training device 105" and/or "paired wearable devices 115-1, 115-2, 115-3 . . . 115-*n*" respectively. In some embodiments, the hub network device 110 can also be configured to provide to a paired device, for example, the paired training device 105, information related to the other paired devices, for example, the paired wearable devices 115-1, 115-2, 115-3 . . . 115-*n*. In accordance with various embodiments, the hub network device 110 can facilitate communication between the paired training device 105 and the paired wearable devices 115-1, 115-2, 115-3 . . . 115-*n*, via the hub network device 110. In some embodiments, the hub network device 110 is configured to support connection or pairing with a predefined number of devices, for example, the training device 105 and/or the wearable devices, for example, 115-1, 115-2, 115-3 . . . 115-*n*. The predefined number of devices is herein referred to as a 'hub network capacity' of the hub network device 110. In accordance with various embodiments, the hub network device 110 includes one or more communication ports to receive and transmit the network communication signals from various devices including, but not limited to, the training device 105 and/or the wearable devices, for example, 115-1 . . . 115-*n*.**

In some embodiments, each wearable device, for example, the wearable device 115-1 of the wearable devices, for example, **115-1, 115-2, 115-3 . . . 115-*n*, includes, a plurality of hardware and software components for performing a plurality of functions respectively. For purposes of clarity and understanding, the components of the wearable device 115-1 are described herein and it will be appreciated by those skilled in the art that other wearable devices, for example, 115-2, 115-3 . . . 115-*n*** may include similar components that perform similar functions.

Figure 2:
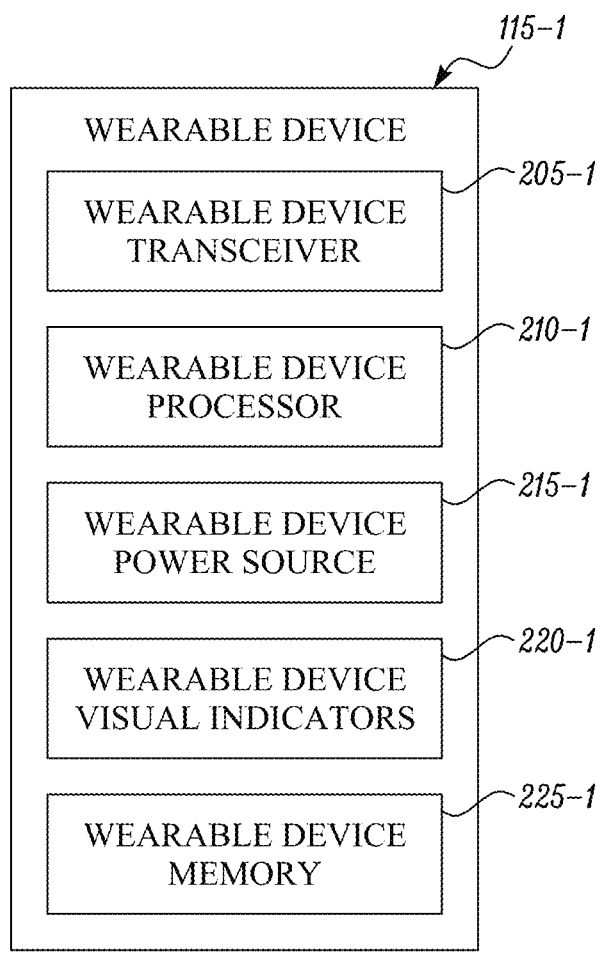
FIG. 2 illustrates a schematic block diagram of an exemplary wearable device included in the exemplary system of FIG. 1, in accordance with some embodiments.

FIG. 2 depicts the wearable device 115-1 in an exemplary and simplified manner. It will be appreciated that each of the wearable devices 115 comprise same or similar component structure. The wearable device 115-1 includes, among other components, a wearable device transceiver 205-1, a wearable device processor 210-1, a wearable device power source 215-1, and at least one wearable device visual indicator 220-1. Although not shown, a person skilled in the art would appreciate that the wearable device 115-1 can also include additional components including, but not limited to, a wearable device display with a wearable device user interface, a wearable device memory 225-1, and/or a wearable device storage unit. In some embodiments, the wearable device 115-1 can also include one or more additional wearable output devices including, but not limited to, wearable device speakers, a wearable device haptic output, or any other output mechanism now known or developed in the future. In addition, in some embodiments, the wearable device 115-1 can further include a serial port, a parallel port, an infrared (IR) interface, a universal serial bus (USB) interface and/or any other interface herein known or developed in the future.

The components of the wearable device 115-1, including, but not limited to, the wearable device transceiver 205-1, the wearable device processor 210-1, wearable device power source 215-1, wearable device visual indicators 220-1, the wearable device memory 225-1, the wearable device display, and the wearable output devices cooperate with one another to enable operations of the wearable device 115-1. Each component can communicate with one another via a local interface (not shown). The local interface can include, but is not limited to, one or more buses or other wired or wireless connections, as is known in the art. The local interface can have additional elements, which are omitted for simplicity, such as controllers, buffers (caches), drivers, repeaters, and receivers, among many others, to enable communications. Further, the local interface can include address, control, and/or data connections to enable appropriate communications among the aforementioned components.

As illustrated, the wearable device 115-1 in the exemplary embodiment includes the wearable device transceiver 205-1 to provide the one or more inputs to and receive the one or more outputs from other devices, such as, the training device 105 via the hub network device 110. The wearable device transceiver 205-1 includes a transmitter circuitry and a receiver circuitry to enable the wearable device 115-1 to communicate data to and acquire data from the training device 105. In this regard, the transmitter circuitry includes appropriate circuitry to provide the one or more inputs, such as, but not limited to, feedback, acknowledgements, wearable device identification, player name, and player identification to the training device 105. Similarly, the receiver circuitry includes appropriate circuitry to receive the one or more outputs, such as, but not limited to, input signals to illuminate the wearable device visual indicators 220-1 from the training device 105. It will be appreciated by those of ordinary skill in the art that the wearable device 115-1 can include a single wearable device transceiver 205-1 as shown, or alternatively separate transmitting and receiving components, for example but not limited to, a transmitter, a transmitting antenna, a receiver, and a receiving antenna. In some embodiments, the wearable device 115-1 can be configured to receive input from the training device 105 via the wearable device transceiver 205-1, and/or provide system output via one or more output devices including, but not limited to, the wearable device visual indicators 220-1, the wearable device display, the wearable device speakers, or the wearable device haptic output, or any other output mechanism now known or developed in the future.

The wearable device memory 225-1 is a non-transitory memory configured to store a set of instructions that are executable by the wearable device processor 210-1 to perform predetermined operations. For example, the wearable device memory 225-1 can include any of the volatile memory elements (for example, random access memory (RAM), nonvolatile memory elements (for example, read only memory (ROM), and combinations thereof. Moreover, the wearable device memory 140 can incorporate electronic, magnetic, optical, and/or other types of storage media. In some embodiments, the wearable device memory 225-1 is also configured to store files, such as but not limited to, the wearable device identification, player details including, but not limited to, the player name and the player identification.

The wearable device processor 210-1 can include one or more microprocessors, microcontrollers, DSPs (digital signal processors), state machines, logic circuitry, or any other device or devices that process information or signals based on operational or programming instructions. The wearable device processor 210-1 can be implemented using one or more controller technologies, such as Application Specific Integrated Circuit (ASIC), Reduced Instruction Set Computing (RISC) technology, Complex Instruction Set Computing (CISC) technology, or any other similar technology now known or in the future developed. The wearable device processor 210-1 is configured to cooperate with other components of the wearable device 115 to perform operations pursuant to communications and the one or more instructions received from the training device 105. The wearable device processor 210-1 is configured to execute the instructions stored in the wearable device memory 225-1 to perform the predetermined operations, for example, illuminating the wearable device visual indicators 220 in one or more colors in response to the inputs received from the training device 105, via the wearable device transceiver 205-1, to display the colors. In some embodiments, the wearable device power source 215-1 is configured to be switched on or activated, via wearable device processor 210-1, to provide electrical power to the wearable device visual indicators 220-1 in order to illuminate the wearable device visual indicators 220-1. It will be appreciated by those with ordinary skill in the art that the wearable device power source 215-1 can correspond to a plurality of wearable device batteries or battery packs coupled with each other. In some embodiments, the plurality of wearable device batteries or battery packs in the wearable device 115-1 are swappable based on a battery status of each wearable device battery in the plurality of wearable device batteries or battery packs. In some embodiments, the components of the wearable device 115-1 can be separated from each other and positioned at different locations in the wearable device 115-1. For example, the wearable device 115-1 can correspond to a smart jersey including the wearable device power source 215-1 and the wearable device visual indicators 220-1 separate from each other and provided at different locations in the smart jersey.

In some embodiments, the training device 105 (see FIG. 1) interfaces directly with the plurality of wearable devices, for example, 115-1, 115-2, 115-3 . . . 115-*n* via the direct or peer-to-peer communication network, for example, 120-1 . . . 120-*n*, such as, but not limited to, the Wi-Fi Direct network. In some embodiments, the training device 105 interfaces with the wearable devices, for example, 115-1, 115-2, 115-3 . . . 115-*n* via the hub network device 110 and the associated hub network 110-1. In an exemplary embodiment, the training device 105 operates as an interface for the instructor/coach to interact with the players associated with the wearable devices, for example, 115-1, 115-2, 115-3 . . . 115-*n*. The coach utilizes the training device 105 to provide one or more inputs, such as but not limited to, one or more training device communication signals to the wearable devices, for example, 115-1, 115-2, 115-3 . . . 115-*n*, directly via the peer-to-peer communication network, for example, 120-1 . . . 120-*n*, or via the hub network device 110-1 and the associated hub network 110-1 to illuminate the wearable device visual indicators, for example, 220-1, 220-2, 220-3 . . . 220-*n* of each of the plurality of wearable devices, for example, 115-1, 115-2, 115-3 . . . 115-*n*, to provide one or more visual cues to the players via the wearable device visual indicators for example, 220-1, 220-2, 220-3 . . . 220-*n* respectively. Examples of the visual cues include, but are not limited to, colors, text, patterns, images, and video. The training device 105 includes a plurality of electrical and electronic components, providing power, operational control, communication, and the like within the training device 105. The various components of the training device 105 will now be described hereinafter.

Figure 3:
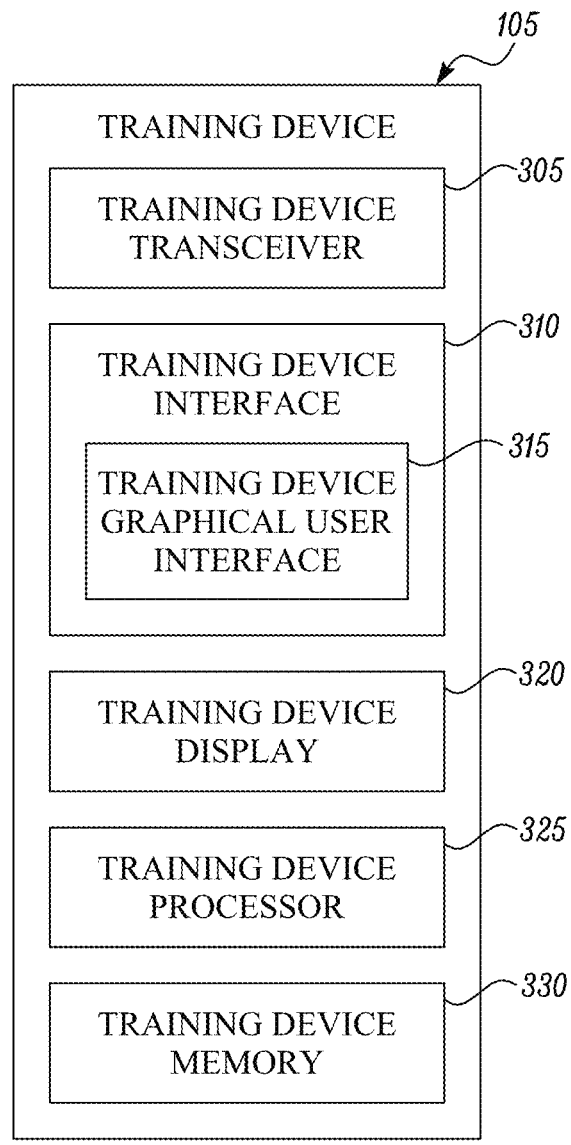
FIG. 3 illustrates a schematic block diagram of an exemplary training device included in the exemplary system of FIG. 1, in accordance with some embodiments.

FIG. 3 depicts the training device 105 in an exemplary and simplified manner. However, it should be appreciated by those of ordinary skill in the art that a practical embodiment can include additional components and suitably configured logic to support known or conventional operating features that are not described in detail herein. It will further be appreciated by those of ordinary skill in the art that the training device 105 alternatively can function within a remote server, cloud computing device, or any other local or remote computing mechanism now known or developed in the future. Although the training device 105 is shown and described to be implemented within a single computing device, it can be contemplated that the one or more components of the training device 105 can alternatively be implemented in a distributed computing environment.

The training device 105 includes, among other components, a training device transceiver 305, a training device interface 310 including a training device graphical interface 315, a training device display 320, a training device processor 325, and a training device memory 330. The components of the training device 105, including the training device transceiver 305, the training device interface 310, the training device display 320, the training device processor 325, and the training device memory 330, cooperate with one another to enable operations of the training device 105. Each component can communicate with one another via a local interface (not shown). The local interface can be, such as, but not limited to, one or more buses or other wired or wireless connections, as is known in the art. The local interface can have additional elements, which are omitted for simplicity, such as controllers, buffers (caches), drivers, repeaters, and receivers, among many others, to enable communications. Further, the local interface can include address, control, and/or data connections to enable appropriate communications among the aforementioned components.

The training device 105, in the exemplary embodiment, includes the training device transceiver 305 to provide the one or more inputs to and receive the one or more outputs from the wearable devices, for example, 115-1, 115-2, 115-3 . . . 115-n, directly, via the direct or peer-to-peer communication network, for example, 120-1 . . . 120-n and/or via the hub network device 110 and the associated hub network 110-1. The training device transceiver 305 includes a transmitter circuitry and a receiver circuitry to enable the training device 105 to communicate data or instructions to and acquire data from wearable devices, for example, 115-1, 115-2, 115-3 . . . 115-n, directly, via the direct or peer-to-peer communication network, for example, 120-1 . . . 120-n and/or via the hub network device 110 and the associated hub network 110-1. In this regard, the transmitter circuitry includes appropriate circuitry to provide the one or more inputs, such as, but not limited to, one or more signals, via the hub network device 110, to the wearable devices, for example, 115-1, 115-2, 115-3 . . . 115-n, to illuminate the wearable device visual indicators 220 of the wearable devices, for example, 115-1, 115-2, 115-3 . . . 115-n, and provide the visual cues respectively. Similarly, the receiver circuitry includes appropriate circuitry to receive, via, the hub network device 110, the one or more outputs including but not limited to, wearable device identification, player name, player identification, hub network device identification including, but not limited to, Media Access Control (MAC) address, Internet Protocol (IP) address, and any other information related to the players, the wearable devices, for example, 115-1, 115-2, 115-3 . . . 115-n, and/or the hub network device 110, from the wearable devices, for example, 115-1, 115-2, 115-3 . . . 115-n, and/or the hub network device 110. It will be appreciated by those of ordinary skill in the art that the training device 105 can include a single training device transceiver 305 as shown, or alternatively separate transmitting and receiving components, for example but not limited to, a transmitter, a transmitting antenna, a receiver, and a receiving antenna.

The training device interface 310 is configured to receive one or more instructor/coach inputs and/or to provide one or more system outputs to the instructor/coach or to the wearable devices, for example, 115-1, 115-2, 115-3 . . . 115-n, via the direct or peer-to-peer communication network, for example, 120-1 . . . 120-n and/or via the hub network device 110 and the associated hub network 110-1. The instructor/coach inputs can be provided via a keyboard, a touch screen display (such as, the training device display 320), a camera, a touch pad, a microphone, a recorder, a mouse or any other user input mechanism now known or developed in the future. It will be appreciated by those of ordinary skill in the art that the training device 105 can also be configured to provide the instructor/coach inputs to a remote server (not shown) such that the instructor/coach inputs and any other input information including, but not limited to, input fields, selection options, and questions related to or associated with the instructor/coach inputs, is stored by the remote server. In such embodiments, the training device 105 can be configured to retrieve, via the training device processor 325, the instructor/coach inputs and the input information related to or associated with the instructor/coach inputs from the remote server and present the retrieved the instructor/coach inputs and/or the input information via system output. The system output can be provided via a display device, such as the training device display 320, training device speakers, training device haptic output components, or any other output means, or mechanism now known or developed in the future. The training device interface 310 can further include a serial port, a parallel port, an infrared (IR) interface, a universal serial bus (USB) interface and/or any other interface herein known or developed in the future.

In some embodiments, the training device graphical user interface 315 of the training device interface 310 is configured to receive and display communication received from the wearable devices, for example, 115-1, 115-2, 115-3 . . . 115-n, via the direct or peer-to-peer communication network, for example, 120-1 . . . 120-n and/or via the hub network device 110 and the associated hub network 110-1. In some embodiments, the training device graphical user interface 315 is also configured to receive the instructor/coach input and provide instructions to the wearable devices, for example, 115-1, 115-2, 115-3 . . . 115-n, via the direct or peer-to-peer communication network, for example, 120-1 . . . 120-n and/or via the hub network device 110 and the associated hub network 110-1. The training device graphical user interface 315 can be an application or web portal or any other suitable interface now known or developed in the future for conducting a training session for the players. The training device graphical user interface 315 includes one or more of graphical elements associated with the training session. The graphical elements can include, but not limited to one or more of graphical icons, control buttons, timelines, selection boxes, progress indicators, pull-down menus, on-off checkmarks, scroll bars, windows, window edges, toggle buttons, and/or forms. The graphical elements can be used in conjunction with text to prompt the instructor/coach for an input, respond to instructor/coach actions, or display information to the instructor/coach in response to the one or more inputs, feedback or instructions received from the wearable devices, for example, 115-1, 115-2, 115-3 . . . 115-n.

The training device display 320 is configured to display data, images, and the like. The training device display 320 includes a display screen or a computer monitor or any other display mechanism now known or in the future developed. In accordance with some embodiments, the training device display 320 is configured to display the training device graphical user interface 315 associated with the conducting of one or more training sessions for the players.

The training device memory 330 is a non-transitory memory configured to store a set of instructions that are executable by the training device processor 325 to perform predetermined operations. For example, the training device memory 330 can include any of the volatile memory elements (for example, random access memory (RAM), non-volatile memory elements (for example, read only memory (ROM), and combinations thereof. Moreover, the training device memory 330 can incorporate electronic, magnetic, optical, and/or other types of storage media. In some embodiments, the training device memory 330 is also configured to store files, such as but not limited to, wearable device identification, player names, player identification, player historical performance, predefined activities, game modes, predefined activity definitions, rules, strategies, player ratings, scores, hub network device identification including, but not limited to, Media Access Control (MAC) address, Internet Protocol (IP) address, and any other information related to the players, the wearable devices, for example, 115-1, 115-2, 115-3 . . . 115-n, and/or the hub network device 110. In some embodiments, the training device memory 330 is also configured to store one or more machine learning, artificial intelligence, logical, and/or conditional modules, algorithms, and/or models.

The training device processor 325 can include one or more microprocessors, microcontrollers, DSPs (digital signal processors), state machines, logic circuitry, or any other device or devices that process information or signals based on operational or programming instructions. The training device processor 325 can be implemented using one or more controller technologies, such as Application Specific Integrated Circuit (ASIC), Reduced Instruction Set Computing (RISC) technology, Complex Instruction Set Computing (CISC) technology, or any other similar technology now known or in the future developed. The training device processor 325 is configured to cooperate with other components of the training device 105 to perform operations. In some embodiments, the training device processor 325 is also configured to execute and/or implement the one or more machine learning, artificial intelligence, logical, and/or conditional operations, modules, algorithms, and/or models to perform operations. In some embodiments, the training device processor 325 is also configured to access, retrieve, execute, and/or implement the one or more instructions and/or the one or more machine learning, artificial intelligence, logical, and/or conditional operations, modules, algorithms, and/or models stored in a remote server (not shown) to perform operations. The training device processor 325 is configured to execute the instructions stored in the training device memory 330 to perform the predetermined operations, for example, the detailed functions of the training device 105 for conducting a training session for the players will be described hereinafter.

Figure 4:
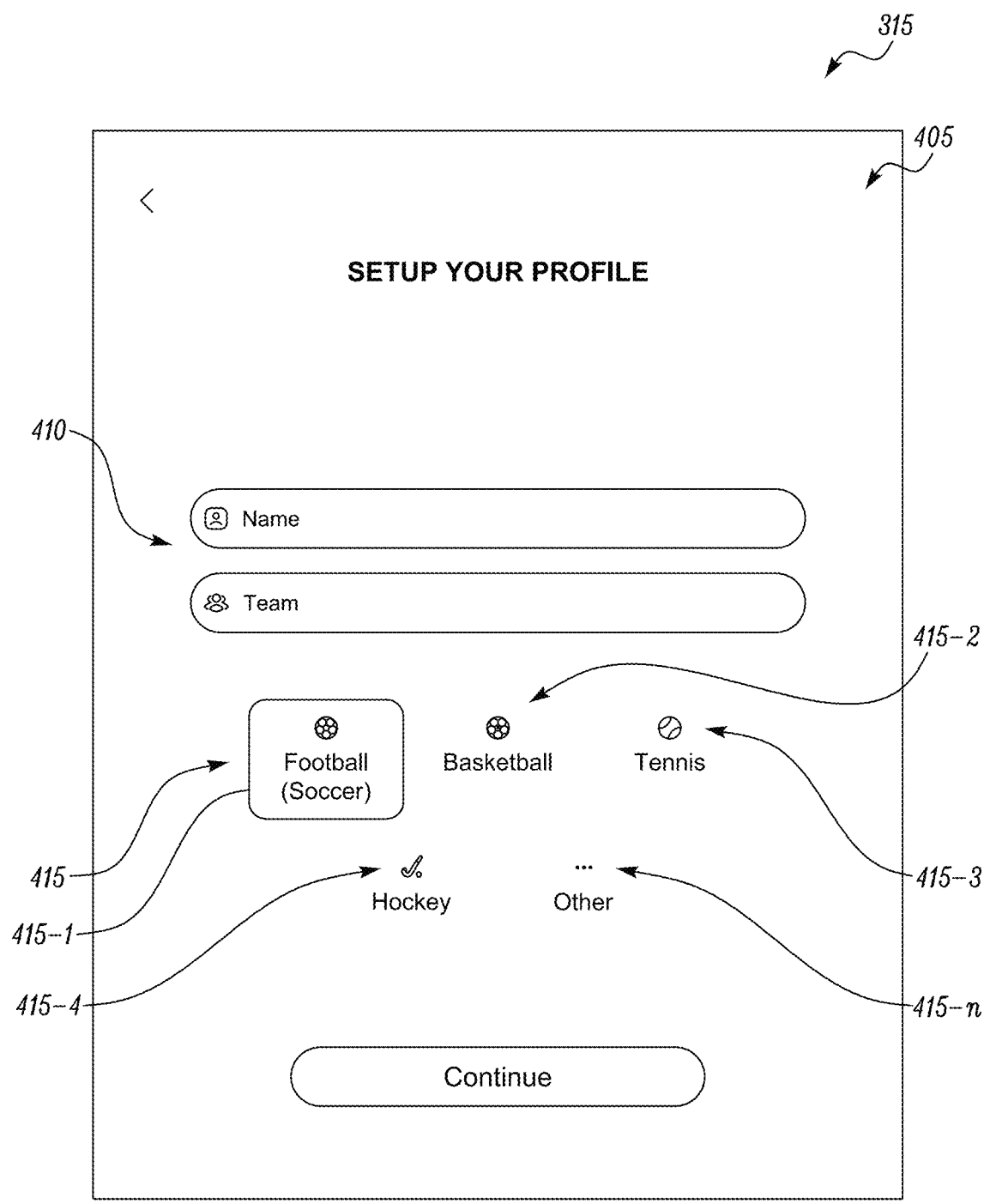
FIG. 4 illustrates an exemplary graphical user interface of the training device of FIG. 3 for registration of an instructor/coach managing or conducting the training session.
Figure 5:
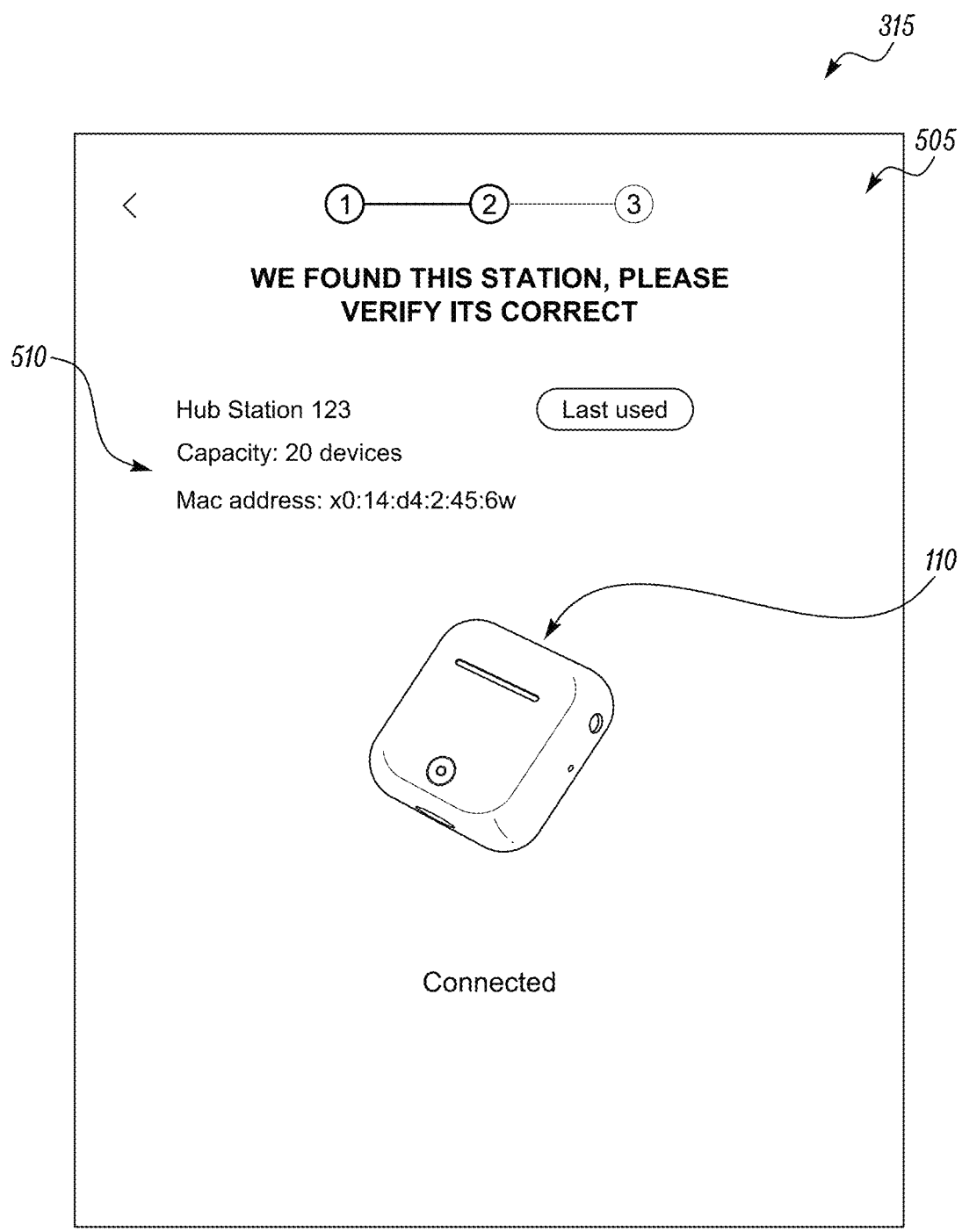
FIG. 5 illustrates an exemplary graphical user interface of the training device of FIG. 3 for establishing connection and/or communication with an exemplary hub network device included in the exemplary system of FIG. 1, in accordance with some embodiments.
Figure 6:
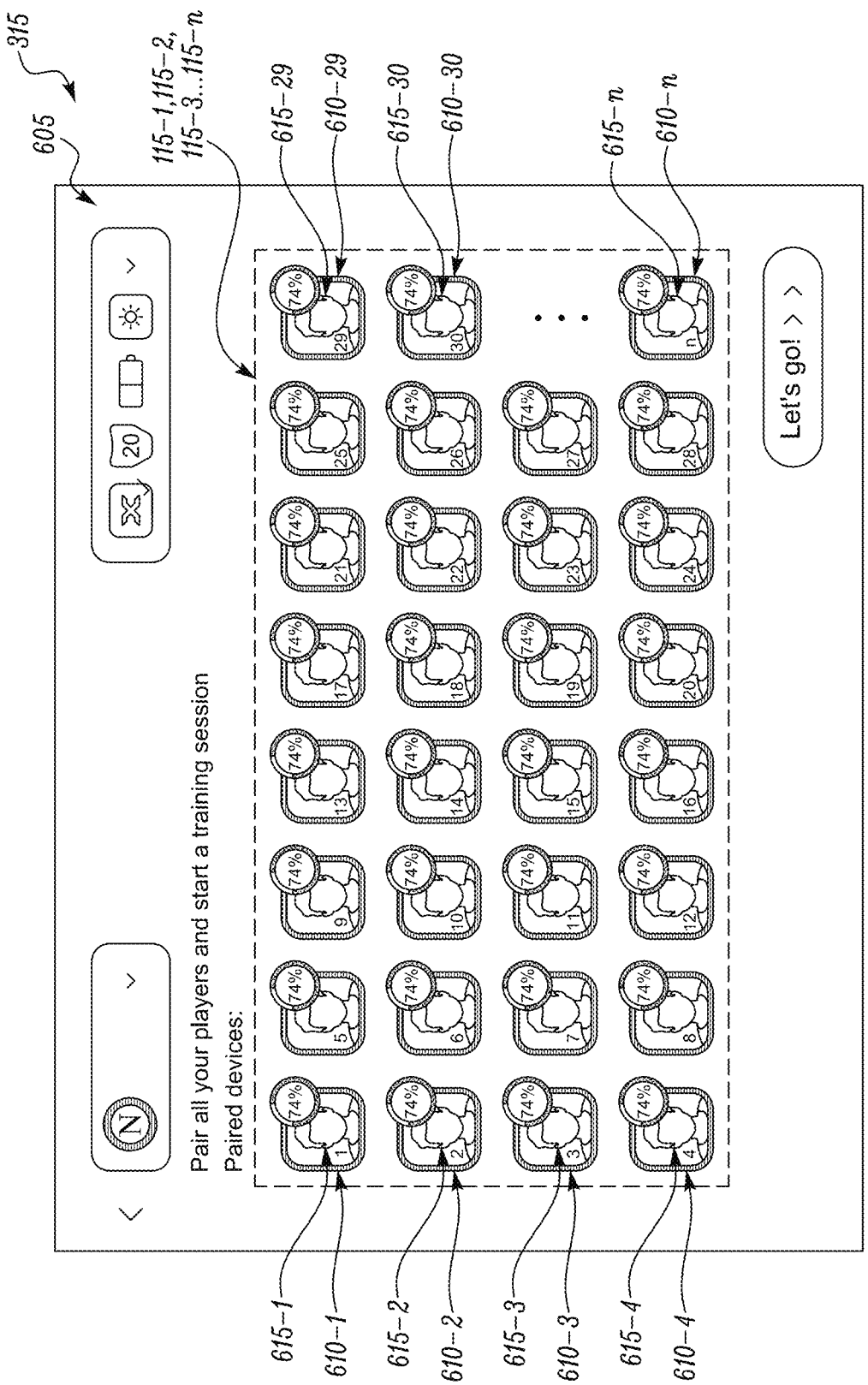
FIG. 6 illustrates an exemplary graphical user interface of the training device of FIG. 3 for identifying wearable devices of players paired with the hub network device included in the exemplary system of FIG. 1, in accordance with some embodiments.

FIGS. 4 through 6 illustrate exemplary graphical user interfaces of the training device of FIG. 3 for establishing communication with the hub network device 110 and the wearable devices, for example, 115-1, 115-2, 115-3 . . . 115-n, of the players respectively.

As illustrated in FIG. 4, the training device 105 is configured to display, via the training device graphical user interface 315, for example, a registration user interface 405 to receive one or more instructor inputs from the instructor/coach managing the training sessions. In an exemplary embodiment, the registration user interface 300 includes one or more registration fields 410 related to instructor/coach details. Examples of the instructor/coach details include, but not limited to, instructor/coach name, team name associated with the instructor/coach and one or more sport icons, for example, 415-1, 415-2, 415-3, 415-4 . . . 415-n, associated with one or more sporting activities including, but not limited to, football, soccer, tennis, basketball, and any other team activity now known or in the future developed. In some embodiments, the training device 105 is configured to receive, via the training device processor 325, the instructor/coach inputs corresponding to the registration fields 410 and the sport icons, for example, 415-1 . . . 415-n from the instructor/coach via the training device graphical user interface 315 or any other input mechanism provided in the training device 105. For example, the coach can select a sport icon 415-1 for football/soccer indicating that the training session corresponds to the sport of football/soccer. In some embodiments, the training device 105 can be configured to store, via the training device processor 325, the instructor/coach inputs received corresponding to the registration fields 410 and the sport icon 415-1 in the training device memory 330. It will be appreciated by those of ordinary skill in the art that the training device 105 can also be configured to provide, via the training device processor 325, the received instructor/coach inputs to the remote server (not shown) such that the instructor/coach inputs corresponding to the registration fields 410 and the sport icon 415-1 selected by the coach can be retrieved by the training device 105 from the remote server, via the training device processor 325 and the training device transceiver 305. In some embodiments, the training device 105 can be configured to determine, via, for example, the training device processor 325, the subsequent set of graphical elements or interfaces with different graphic elements respectively to be displayed on the training device graphical user interface 315 based on the received instructor/coach inputs. In such embodiments, the interfaces and/or the graphical elements to be displayed based on the received instructor/coach input corresponding to each sport icon of the sport icons 415 can be different with respect to each other. For example, the training device 105 can be configured to determine, via, for example, the training device processor 325, a first interface including a first set of graphical elements to be displayed in response to the received instructor/coach input corresponding to the sport icon 415-1 representing 'Football (soccer)' and a second interface including a second set of graphical elements to be displayed in response to the received instructor/coach input corresponding to the sport icon 415-2 representing 'Basketball'.

FIG. 5 illustrates the training device graphical user interface 315 of the training device of FIG. 3 for identifying the wearable devices, for example, 115-1, 115-2, 115-3 . . . 115-n, connected with the training device 105 via the peer-to-peer communication network, for example, 120-1 . . . 120-n (see FIG. 1) or paired with the hub network device 110 (see FIG. 1) via the hub network 110-1 (see FIG. 1). In accordance with various embodiments, the training device 105 is configured to detect the hub network device 110, via the training device transceiver 305 and the hub network 110-1 (see FIG. 1) and establish a connection or pair with the hub network device 110. In some embodiments, the training device 105 is also configured to transmit and receive the network communication signal, for example, but not limited to, a Bluetooth® signal via the training device transceiver 305. In some embodiments, the training device 105 is configured to receive the instructor/coach input to enable the training device transceiver 305 to receive and/or transmit the network communication signal. In accordance with various embodiments, the training device 105 is configured to receive the network communication signal from the hub network device 110 and detect the hub network device 110 based on the received network communication signal. In some embodiments, the training device 105 is configured to receive, via the training device transceiver 305, hub network device information 510 from the hub network device 110 upon detecting the hub network device 110 via a first network communication signal transmitted by the hub network device 110. The hub network device information 510 can include, but is not limited to, hub network device name, hub network device identification including, but not limited to, hub network Media Access Control (MAC) address, and the hub network capacity. In some embodiments, the training device 105 is configured to display the detected hub network device 110 via, for example, a network connection user interface 505 provided on the training device graphical user interface 315. In some embodiments, the training device 105 is also configured to display the hub network device information 510 received from the hub network device 110. In some embodiments, the training device 105 is configured to establish connection with the detected hub network device 110 displayed on the training device graphical user interface 315 in response to the instructor/coach input. It will be appreciated by those with ordinary skill in the art that the training device 105 can also be configured to automatically connect to or pair with the hub network device 110 upon detection of the hub network device 110 via the first network communication signal.

FIG. 6 illustrates the training device graphical user interface 315 of the training device of FIG. 3 for identifying the wearable devices, for example, 115-1, 115-2, 115-3 . . . 115-n, directly connected to the training device 105 via the peer-to-peer network, for example, 120-1 . . . 120-n or paired with the hub network device 110 via the hub network 110-1. In an exemplary embodiment, the training device 105 is configured to display, via the training device graphical user interface 315, a plurality of icons, for example, 610-1, 610-2, 610-3 . . . 610-n correspondingly representing the players, for example, 615-1, 615-2, 615-3 . . . 615-n associated with respective wearable devices, for example, 115-1, 115-2, 115-3 . . . 115-n. In some embodiments, the training device 105 is configured to receive, via the training device transceiver 305, wearable device information related to the wearable devices, for example, 115-1, 115-2, 115-3 . . . 115-n, directly from the wearable devices, for example, 115-1, 115-2, 115-3 . . . 115-n. In some embodiments, the training device 105 is configured to receive, via the training device transceiver 305, wearable device information related to the wearable devices, for example, 115-1, 115-2, 115-3 . . . 115-n connected to or paired with the hub network device 110 via a second network communication signal transmitted by the hub network device 110. The wearable device information can include, but is not limited to, wearable device name, wearable device identification, wearable device battery status, player name, and player identification. In some embodiments, the training device 105 is configured to display the wearable devices, for example, 115-1, 115-2, 115-3 . . . 115-n, directly connected with the training device 105 or paired with the hub network device 110, via, for example, a paired players user interface 605 provided on the training device graphical user interface 315. In some embodiments, the training device 105 is also configured to display, via the training device graphical user interface 315, the received wearable device information corresponding the wearable devices, for example, 115-1, 115-2, 115-3 . . . 115-n, respectively.

FIGS. 7 through 12 illustrate graphical user interfaces of the exemplary training device of FIG. 3 for conducting one or more training sessions for the players, for example, 615-1 . . . 615-n (see FIG. 6).

Figure 7:
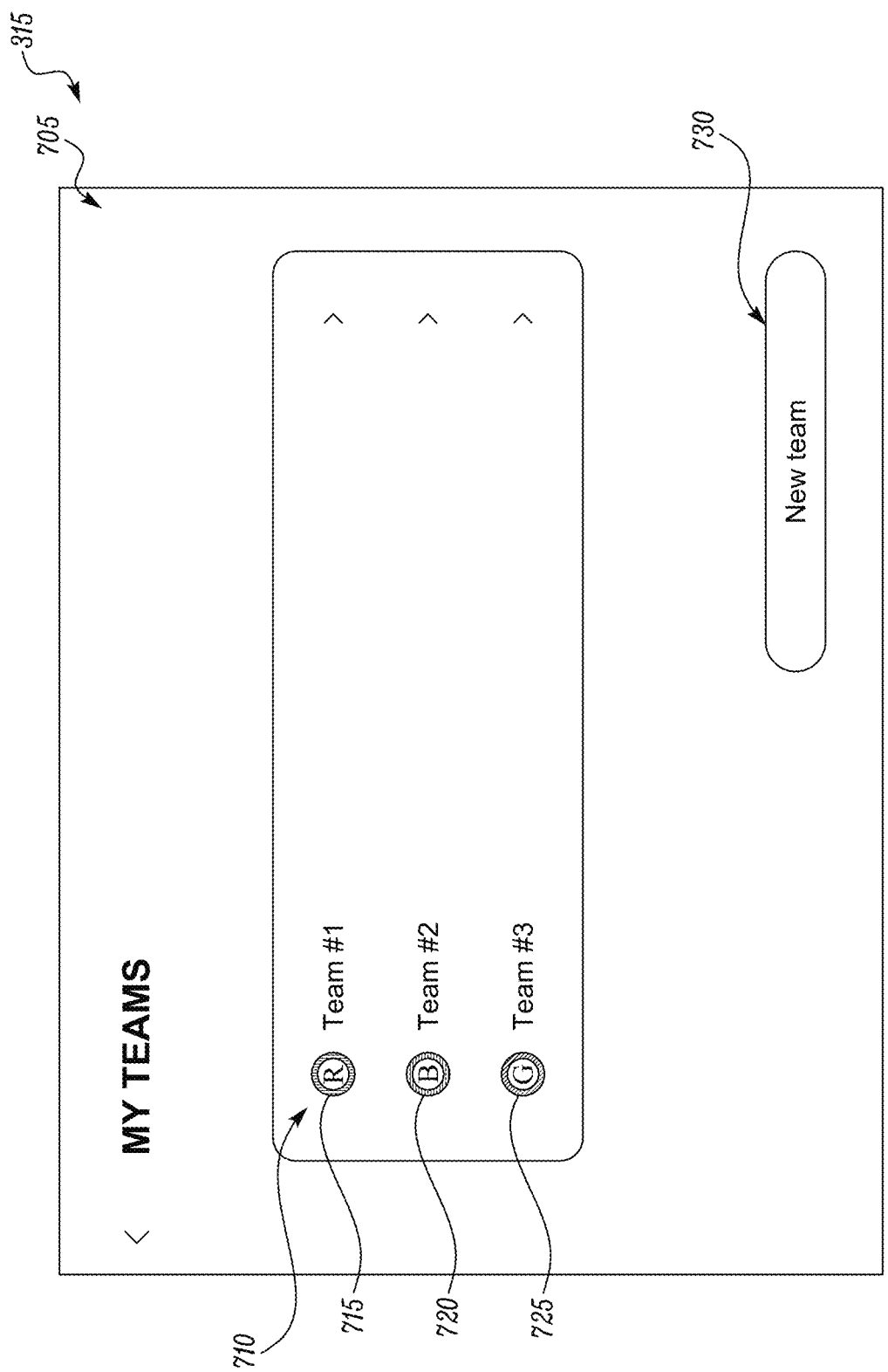
FIGS. 7 and 8 illustrate an exemplary graphical user interface of the training device of FIG. 3 for creating virtual teams of players with corresponding wearable devices, in accordance with some embodiments.

As illustrated in FIG. 7, in some embodiments, the training device 105 is configured to create, via the training device processor 325, a plurality of virtual teams 710 of the players, for example, 615-1 . . . 615-n (see FIG. 6) associated with the wearable devices 115-1, 115-2, 115-3 . . . 115-n (see FIG. 6). In an exemplary embodiment, the training device 105 is configured to display, via, for example, a team creation user interface 705 provided on the training device graphical interface 315, to enable the instructor/coach to create the plurality of virtual teams 710 including, but not limited to, a first virtual team 715, a second virtual team 720, and a third virtual team 725, via, for example, a graphical team creation button 730. In some embodiments, the training device 105 is configured to receive one or more instructor/coach inputs related to the teams to be created, via the training device graphical interface 315 or any other input mechanism. Examples of the instructor/coach inputs related to each virtual team include, but are not limited to, team name and a team logo/icon. In accordance with various embodiments, the training device 105 is configured to automatically create, via the training device processor 325, a randomized set of virtual teams based on a count of the connected wearable devices, for example, 115-1, 115-2, 115-3 . . . 115-n, of the players identified by the training device 105. In some embodiments, a count of the players associated with respective wearable devices 115-1, 115-2, 115-3 . . . 115-n, in each created team of the randomized set of created virtual teams can be different from each other. In some embodiments, the players associated with the respective wearable devices 115-1, 115-2, 115-3 . . . 115-n, included in each created team of the randomized set of created virtual teams can be different from each other. In some embodiments, at least one player of the players associated with the respective wearable devices 115-1, 115-2, 115-3 . . . 115-n, is included in a plurality of created virtual teams of the randomized set of created virtual teams. In an exemplary embodiment, the training device 105 is configured to create the plurality of virtual teams 710 based on a selection of one or more icons of the plurality of icons, for example, 610-1 . . . 610-n (see FIG. 6) corresponding to the players, for example, 615-1 . . . 615-n (see FIG. 6) in each virtual team. In some embodiments, the training device 105 is configured to apply, via the training device processor 325, at least one artificial intelligence model to create the plurality of virtual teams 710 including, for example, but not limited to, the first virtual team 715, the second virtual team 720, the third virtual team 725 and/or the randomized set of teams based on historical data including, but not limited to, at least one of previously created virtual teams previously conducted training session with the created virtual teams, and/or player performance.

Figure 8:
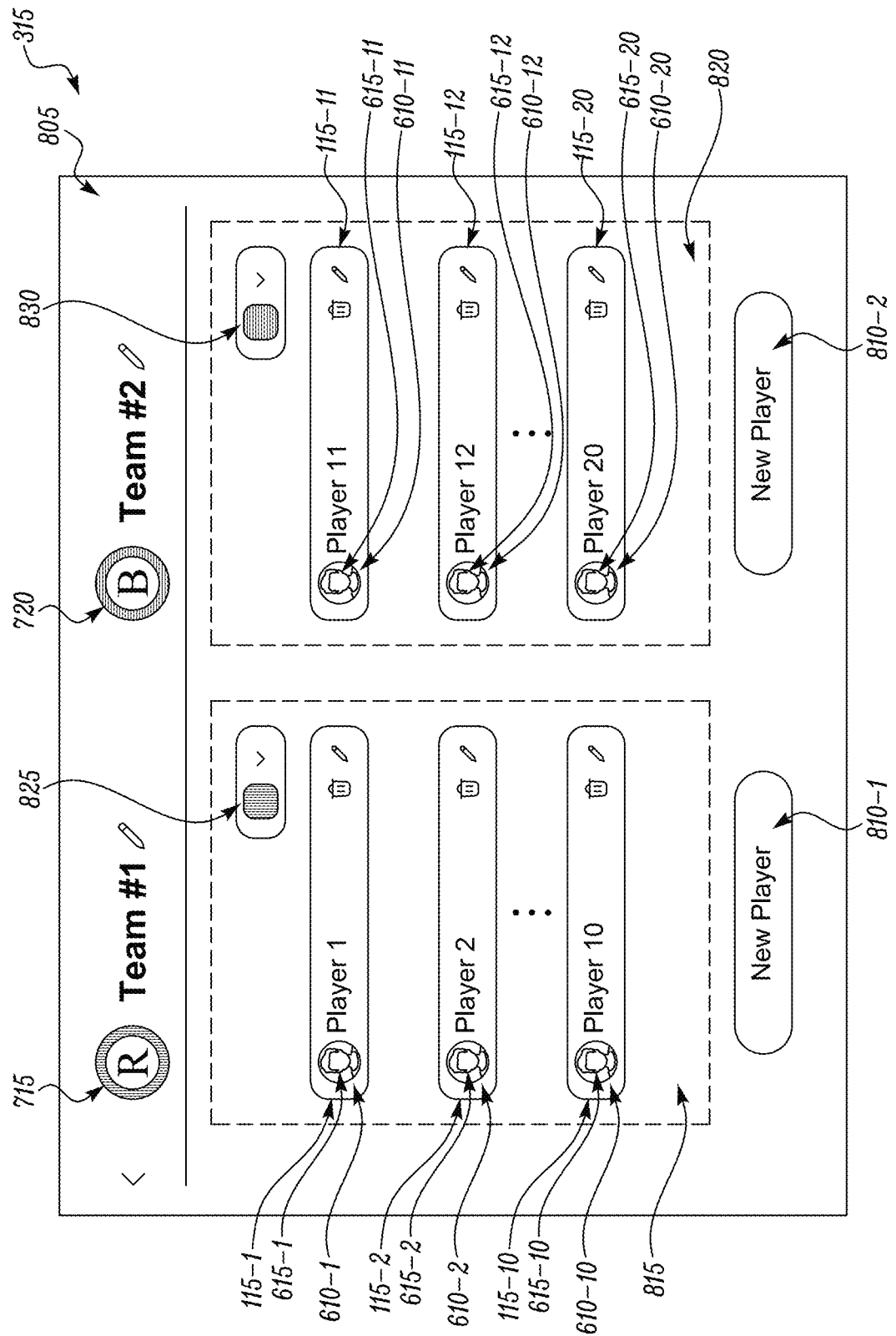

FIG. 8 illustrates an exemplary training device graphical user interface 315 of the training device of FIG. 3 for including one or more players of the players, for example, 615-1 . . . 615-n (see FIG. 6) in each virtual team of the plurality of virtual teams 710 (see FIG. 7). In an exemplary embodiment, the training device 105 is configured to display, via, for example, a player selection user interface 805 provided on the training device graphical interface 315, to enable the selection, via, for example, one or more graphical player selection buttons, for example, 810-1, 810-2 and inclusion of one or more subsets of players of the players, for example, 615-1 . . . 615-n associated with respective subsets of wearable devices of the wearable devices, for example, 115-1 . . . 115-n in each virtual team. In some embodiments, a selection of the graphical player selection button 810-1, via the training device graphical user interface 315, causes the training device 105 to display, via the training device processor 325, the paired players user interface 605 (see FIG. 6) and receive the selection of the players, for example, 615-1 . . . 615-n via the paired players user interface 605. In some embodiments, upon receipt of the selection from the paired players user interface 605, the training device 105 is configured to display the player selection user interface 805 including one or more icons of the icons, for example, 610-1 . . . 610-n (see FIG. 6) representing the one or more selected players, via the training device graphical user interface 315.

As an example, the training device 105 is configured to create, via the training device processor 325, the first virtual team 715 (see FIG. 7), based on the selection of a first subset of icons, for example, 610-1, 610-2 . . . 610-10 of the plurality of icons 610-1 . . . 610-n (see FIG. 6) corresponding to a first subset of players, for example, 615-1, 615-2 . . . 615-10 of the plurality of players, for example, 615-1 . . .

615-*n* (see FIG. 6). The training device 105 is also configured to create, via the training device processor 325, the second virtual team 720 (see FIG. 7), based on a selection of a second subset of icons, for example, 610-11 . . . 610-20, of the plurality of icons 610-1 . . . 610-*n* corresponding to a second subset of players, for example, 615-11, 615-12 . . . 615-20 of the plurality of players, for example, 615-1 . . . 615-*n*. In some embodiments, the first subset of selected players, for example, 615-1 . . . 615-10 is different from the second subset of selected players, for example, 615-11 . . . 615-20. In some embodiments, the training device 105 is configured to create the first virtual team 715 and the second virtual team 720 by selectively moving one or more icons of the icons, for example, 610-1 . . . 610-*n* to a first designated area 815 and a second designated area 820. For example, the training device 105 is configured to create the first virtual team and the second virtual team by moving the corresponding first subset of icons, for example, 610-1, 610-2 . . . 610-10 and the second subset of icons 610-11, 610-12 . . . 610-20 to the first designated area 815 and the second designated area 820 respectively on the training device graphical user interface 315 based on one or more instructor/coach inputs received via the training device graphical user interface 315 or any other input means/mechanism. In some embodiments, the training device 105 is configured to apply, via the training device processor 325, at least one artificial intelligence model to automatically create the first virtual team 715 and the second virtual team 720, based on historical data including, but not limited to, at least one of previously created virtual teams previously conducted training session with the created virtual teams, and/or player performance. In some embodiments, the training device 105 is also configured to edit, via the training device processor 325 and the training device graphical user interface 315, player details including, but not limited to, the player name, and player image/avatar/icon associated with the players upon the selection of the icons, for example, 610-1 . . . 610-*n* representing the players, for example, 615-1 . . . 615-*n* in each virtual team. In some embodiments, the training device 105 is also configured to delete, via the training device processor 325 and the training device graphical user interface 315, one or more players selected and included in each virtual team.

In accordance with various embodiments, the training device 105 is further configured to associate, via the training device processor 325, the created virtual teams 710, for example, the first virtual team 715 and the second virtual team 720, with a plurality of distinct visual cues including, but not limited to, colors, text, patterns, images, and video, respectively. For purposes of clarity and understanding, the plurality of visual cues corresponding to a plurality of distinct colors is disclosed herein after. As an example, the training device 105 can be configured to associate, via the training device processor 215, the first virtual team 715 and the first subset of icons, for example, 610-1 . . . 610-10 with a first color 825 based on a selection of the first color 825 among the plurality of colors via the training device graphical user interface 315. Similarly, the training device 105 can also be configured to associate the second virtual team 720 and the second subset of icons, for example, 610-11 . . . 610-20 with a second color 830 based on a selection of the second color 830, via the training device graphical user interface 315. In some embodiments, the training device 105 is configured to apply, via the training device processor 325, at least one artificial intelligence model to associate the created virtual teams 710 with the plurality of distinct colors. For example, the training device 105 can be configured to apply, via the training device processor 325, at least one artificial intelligence model to automatically associate the first virtual team 715 and the second virtual team 720 with the first color 825 and the second color 830 respectively. In some embodiments, the training device 105 is further configured to selectively associate, via the training device processor 325, one or more selected players of the players, for example, 615-1 . . . 615-*n* with plurality of distinct colors respectively, via the artificial intelligence model or via the instructor/coach inputs received corresponding to the icons, for example, 610-1 . . . 610-*n* representing the players 615, for example, 615-1 . . . 615-*n*, via the training device graphical user interface 315 or other any input means/mechanism.

In some embodiments, the training device 105 is configured to selectively transmit, via the training device processor 215, the training device transceiver 305, a training device communication signal to the wearable devices, for example, 115-1, 115-2, 115-3 . . . 115-*n*, associated with the players, for example, 615-1 . . . 615-*n* to illuminate the wearable device visual indicators, for example, 220-1 . . . 220-*n* (see FIG. 1) of each wearable device in the respective associated color. In some embodiments, the training device 105 is configured to transmit the training device communication signal to the wearable devices, for example, 115-1, 115-2, 115-3 . . . 115-*n* respectively directly via the peer-to-peer network, for example, 120-1 . . . 120-*n* or via the hub network device 110 and the associated hub network 110-1. In some embodiments, the training device 105 may be configured to transmit the training device communication signal to the wearable devices, for example, 115-1, 115-2, 115-3 . . . 115-*n* to illuminate the wearable device visual indicators, for example, 220-1 . . . 220-*n* (see FIG. 1) of each wearable device for a predefined time interval automatically or based on one or more instructor/coach inputs received via the training device graphical user interface 315 or any other input means/mechanism. In some embodiments, the training device 105 is configured to selectively transmit different training device communication signals to different subsets of paired wearable devices based on the selection of the players, for example, 615-1 . . . 615-*n* in the created virtual teams 710 and the color associated with the created virtual teams 710 respectively. For example, the training device 105 is configured to selectively transmit a first training device communication signal to the first subset of paired wearable devices, for example, 115-1 . . . 115-10 of the wearable devices, for example, 115-1, 115-2, 115-3 . . . 115-*n* corresponding to the first subset of players, for example, 615-1 . . . 615-10 to illuminate the wearable device visual indicators 220-1 . . . 220-10 of each of the first subset of wearable devices, for example, 115-1 . . . 115-10 in the first color 825 respectively based on a selection of the first color 825 via the training device graphical user interface 315 or any other input means/mechanism. Similarly, the training device 105 is also configured to transmit, via the training device processor 325, the training device transceiver 305, and the hub network device 110, a second training device communication signal to the second subset of wearable devices, for example, 115-11 . . . 115-20 of the wearable devices, for example, 115-1, 115-2, 115-3 . . . 115-*n* corresponding to the second subset of players, for example, 615-11 . . . 615-20 to illuminate the wearable device visual indicators, for example, 220-11 . . . 220-20 of each of the second subset of wearable devices, for example, 115-11 . . . 115-20 with the second color 830 respectively based on a selection of the second color 830 via the training device graphical user interface 315 or any other input means/ mechanism. In some embodiments, the first color can be same as or different from the second color. In some embodiments, the training device 105 is configured to selectively transmit the training device communication signals to the wearable devices 115-1, 115-2, 115-3 . . . 115-n, associated with respective players in each virtual team immediately in response to the association of the color with each virtual team or the icons, for example, 610-1 . . . 610-n (see FIG. 6) representing the players, for example, 615-1 . . . 615-n (see FIG. 6) respectively. In some embodiments, the training device 105 is configured to define one or more illumination parameters including, but not limited to, a count of the visual indicators to be illuminated in each wearable device, a color intensity of the color, a gradient of the color, a time interval to illuminate each wearable device, and a time interval to change the color to another color, in each training device communication signal. In some embodiments, the training device 105 is configured to receive the illumination parameters and/or one or more instructor/coach inputs corresponding to the illumination parameters via the training device graphical user interface 315 or any other input means/mechanism.

In some embodiments, the hub network device 110 is configured to receive the training device communication signals transmitted from the training device 105 and provide the training device communication signals to the respective wearable devices 115-1, 115-2, 115-3 . . . 115-n, correspondingly associated with the players, for example, 615-1 . . . 615-n. In accordance with various embodiments, the wearable devices 115-1, 115-2, 115-3 . . . 115-n, are configured to receive the training device communication signals from the training device 105 via the hub network device 110 and illuminate, via the respective wearable device processors, for example, 210-1, 210-2, 210-3 . . . 210-n (see FIG. 2), the wearable device visual indicators 220-1, 220-2, 220-3 . . . 220-n (see FIG. 2) of the wearable devices, for example, 115-1, 115-2, 115-3 . . . 115-n respectively. In some embodiments, the wearable devices, for example, 115-1, 115-2, 115-3 . . . 115-n are configured to illuminate the wearable device visual indicators, for example, 220-1 . . . 220-n based on the illumination parameters received from the training device 105, via the hub network device 110. For example, in some embodiments, the wearable devices, for example, 115-1, 115-2, 115-3 . . . 115-n are configured to selectively illuminate, via the respective wearable device processors, for example, 210-1, 210-2, 210-3 . . . 210-n, one or more wearable device visual indicators of each wearable device based on the received training device communication signal. For example, a wearable device 115-1 can include ten light emitting diode (LED) lights and can be configured to selectively illuminate only five light emitting diode (LED) lights based on the received training device communication signal. Similarly, in some embodiments, the wearable devices, for example, 115-1, 115-2, 115-3 . . . 115-n are configured to illuminate the wearable device visual indicators, for example, 220-1 . . . 220-n, based on the color intensity and/or gradient defined the received illumination parameters.

In accordance with various embodiments, the illumination of the visual indicators, for example, 220-1 . . . 220-n in the wearable devices, for example, 115-1 . . . 15-n in one or more colors indicates commencement of one or more predefined activities, each representing a training session to be performed by the virtual teams 710 (see FIG. 7) or the player associated with the corresponding wearable device. As an example, in some embodiments, the illumination of the visual indicators, for example, 220-1 . . . 220-10 of the first subset of wearable devices, for example, 115-1 . . . 115-10 and the visual indicators, for example, 220-11 . . . 220-20 of the first subset of wearable devices, for example, 115-11 . . . 115-20 in the first color and the second color respectively indicates commencement of a first predefined activity between the first virtual team 715 or the first subset of players, for example, 615-1 . . . 615-10 and the second virtual team 720 or the second subset of players, for example, 615-11 . . . 615-20. In some embodiments, the first predefined activity corresponds to a game to be played between the first virtual team 715 or the first subset of players, for example, 615-1 . . . 615-10 and the second virtual team 720 or the second subset of players, for example, 615-11 . . . 615-20 for a predefined time interval. In some embodiments, the training device 105 can be configured to receive instructor/coach input corresponding the predefined time interval in order to define or change the predefined time interval via the training device graphical user interface 315.

Figure 9:
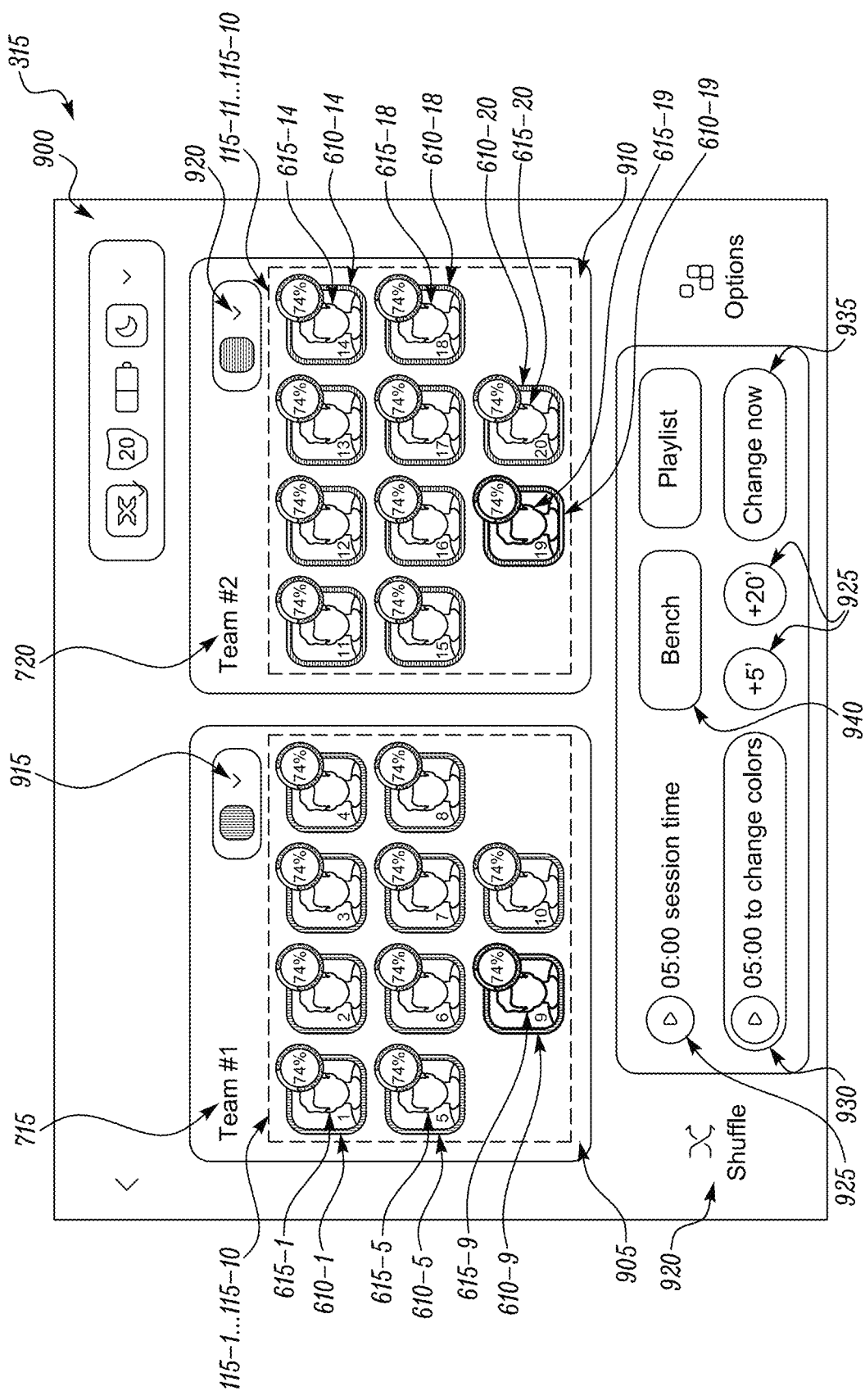
FIG. 9 illustrates an exemplary graphical user interface of the training device of FIG. 3 for conducting a game between two virtual teams, in accordance with some embodiments.

FIG. 9 illustrates an exemplary match session user interface 900 provided on the training device graphical user interface 315 of the training device of FIG. 3 for conducting a first training session for the first virtual team 715 or the first subset of players, for example, 615-1 . . . 615-10, and the second virtual team 720 or the second subset of players, for example, 615-11 . . . 615-20. In some embodiments, the match session corresponds to a sporting game, or any other activity played between at least two virtual teams of the virtual teams, for example, 715, 720, 725 (see FIG. 7). In an exemplary embodiment, the first training session corresponds to a game session or a game mode that includes the first predefined activity. In order to begin the first training session, the training device 105 is configured to associate the first color 825 (see FIG. 8) and the second color 830 (see FIG. 8) with the first virtual team 715 and the second virtual team 720 respectively and transmit the training device communication signals to the first subset of wearable devices, for example, 115-1 . . . 115-10 of first subset of players, for example, 615-1 . . . 615-10, and the second subset of wearable devices, for example, 115-11 . . . 115-20 of the second subset of players, for example, 615-11 . . . 615-20 to illuminate the visual indicators, for example, 220-1 . . . 220-10 of the first subset of wearable devices, for example, 115-1 . . . 115-10 and the visual indicators, for example, 220-11 . . . 220-20 of the second subset of wearable devices, for example, 115-11 . . . 115-20 in the first color the second color respectively to indicate commencement of the first predefined activity. The first predefined activity corresponds to the game to be played between the first virtual team 715 and the second virtual team 720 for the predefined time interval defined and/or displayed, via one or more graphical time interval buttons 925 on the training device graphical user interface 315.

In some embodiments, the training device 105 is also configured to associate, via the training device processor 325, at least one icon, for example, 610-9, 610-19 of the plurality of icons, for example, 610-1 . . . 610-n (see FIG. 6) corresponding to at least one player, for example, 615-9, 615-19 of the plurality of players, for example, 615-1 . . . 615-n (see FIG. 6) with a third color. In some embodiments, the training device 105 is configured to receive an instructor/coach input, via, for example, one or more graphical color selection dropdown options 915, provided on the training device graphical user interface 315, corresponding to the at least one icon to receive a selection of the third color to be associated with the icon. In some embodiments, the third color is different from the first color 825 (see FIG. 8) and the second color 830 (see FIG. 8). For example, the training device 105 can be configured to associate the icons 610-9, 610-19 representing the players 615-9, 615-19 from the first subset of players, for example, 615-1 . . . 615-10 and the second subset of players, for example, 615-11 . . . 615-20 respectively with the third color that is different from the first color previously associated with the icon 610-9 and the second color previously associated with the icon 610-19. In some embodiments, the third color is same as the first color or the second color and different from the previously associated color of the at least one icon corresponding to the at least one player. In such embodiments, associating the least one icon corresponding to the at least one player with the third color corresponds to associating the at least one icon with the first subset of icons, for example, 610-1 . . . 610-10 corresponding to the first subset of players, for example, 615-1 . . . 615-10, or the second subset of icons, for example, 610-11 . . . 610-20 corresponding to the second subset of players, for example, 615-11 . . . 615-20. For example, the training device 105 can be configured to associate the icon 610-9 representing the player 615-9 from the first subset of players, for example, 615-1 . . . 615-10 with the third color equivalent to the second color 830 (see FIG. 8) associated with the second subset of icons, for example, 610-11 . . . 610-20 and accordingly, associate the icon 610-9 with the second subset of icons, for example, 610-11 . . . 610-20 corresponding to the second subset of players, for example, 615-11 . . . 615-20. In some embodiments, the training device 105 is configured to associate the icon 610-9 representing the player 615-9 from the first subset of players, for example, 615-1 . . . 615-10 with the third color equivalent to the second color automatically by moving the icon 610-9 from a first designated area 905 provided on the training device graphical user interface 315 for the first subset of icons, for example, 610-1 . . . 610-10 to a second designated area 910 provided on the training device graphical user interface 315 for the second subset of icons, for example, 610-11 . . . 610-20. In some embodiments, the training device 105 can receive the instructor/coach input via the training device graphical user interface 315 or any other input means/mechanism, for the movement of the at least one icon from the first designated area 905 to the second designated area 910. In some embodiments, the training device 105 is configured to change the previously associated colors of the icons 610-9, 610-19 with the third color automatically after a predefined time interval defined and/or displayed, via the graphical color change button 930 provided on the training device graphical user interface 315. In some embodiments, the training device 105 is configured to change the previously associated colors of the icons 610-9, 610-19 with the third color in response to an instructor/coach input received via a graphical instructor color change button 935 provided on the training device graphical user interface 315. In some embodiments, the training device 105 is configured to randomly select one or more icons from the first subset of icons, for example, 610-1 . . . 610-10 associated with the first color and associate with the randomly selected icons with the third color equivalent to the second color. In some embodiments, the training device 105 is also configured to randomly select one or more icons from the second subset of icons, for example, 610-11 . . . 610-20 associated with the second color and associate with the randomly selected icons with the third color equivalent to the first color. In such embodiments, the training device 105 is configured to randomly select the one or more icons in response to the instructor/coach input received, via, for example, a graphical shuffle players button 920 provided on the training device graphical user interface 315.

In some embodiments, the training device 105 is configured to associate the at least one icon with the third color such that a count of the first subset of icons, for example, 610-1 . . . 610-10 representing the first subset of players, for example, 615-1 . . . 615-10 is different from a count of the second subset of icons, for example, 610-11 . . . 610-20 representing the second subset of players, for example, 615-11 . . . 615-20 after the association. It will be appreciated by those of ordinary skill in the art that the training device 105 can be configured to associate at least one icon with the third color and/or move the icon from the first designated area 905 to the second designated area 910 after a predefined interval of time or at any given point in time during the first training session. It will also be appreciated by those of ordinary skill in the art that the training device 105 can be configured to identify the at least one icon from the first subset of icons, for example, 610-1 . . . 610-10, the second subset of icons, for example, 610-11 . . . 610-20 or the remaining icons from the plurality of icons, for example, 610-21 . . . 610-n (see FIG. 6).

In some embodiments, the training device 105 is also configured to transmit, via the training device processor 325, one or more third training device communication signals to one or more wearable devices, for example, 115-9, 115-19 of the plurality of wearable devices, for example, 115-1, 115-2, 115-3 . . . 115-n associated with the one or more players, for example, 615-9, 615-19 representing the one or more icons, for example 610-9, 610-19 associated with the third color to illuminate the visual indicators, for example, 220-9, 220-19 of respective wearable devices, for example, 115-9, 115-19 associated with the players, for example, 615-9, 615-19 in the third color. In some embodiments, the training device 105 is configured to transmit the third training device communication signals to the wearable devices, for example, 115-9, 115-19 respectively directly via the peer-to-peer network, for example, 120-1 . . . 120-n or via the hub network device 110 and the associated hub network 110-1. In some embodiments, the training device 105 is configured to apply, via the training device processor 325, at least one artificial intelligence model to automatically identify or randomly select and associate the at least one icon among the plurality of icons, for example, 610-1 . . . 610-n with the third color and transmit the third signal to the wearable device corresponding to the player representing the icon associated with the third color. In some embodiments, the artificial intelligence model is trained based on at least one previously conducted training session.

In some embodiments, the illumination of the visual indicators in the third color indicates commencement of a second predefined activity by the player representing the icon associated with the third color. In some embodiments, the second predefined activity corresponds to assigning one or more players, for example, 615-9, 615-19 representing the icons 610-9, 610-19 associated with the third color to rest or withdraw from the first training session. In some embodiments, the training device 105 can also be configured to automatically select, via the training device processor 325, one or more icons, for example, 610-9, 610-19 to rest or withdraw the players 615-9, 615-19 representing the icons 610-9, 610-19 from the first training session after a predefined time interval from the start of the first training session. In some embodiments, the training device 105 can also be configured to selectively rest or withdraw the players, for example, 615-9, 615-19 representing the icons, for example, 610-9, 610-19 from the first training session based on the selection of the icons 610-9, 610-19 via the training device graphical interface 315 and a selection of a graphical bench player button 940 provided on the training device graphical interface 315. In some embodiments, the illumination of the visual indicator in the third color indicates feedback or a predefined instruction for the at least one player, for example, the player 615-9. For example, the feedback can represent a performance rating of the player. In some embodiments, the second predefined activity corresponds to the at least one player of the players, for example, 615-1 . . . 615-n (see FIG. 6) optionally playing for the first virtual team 715 or the second virtual team 720 as a 'double agent' as described in detail hereinafter.

Figure 10:
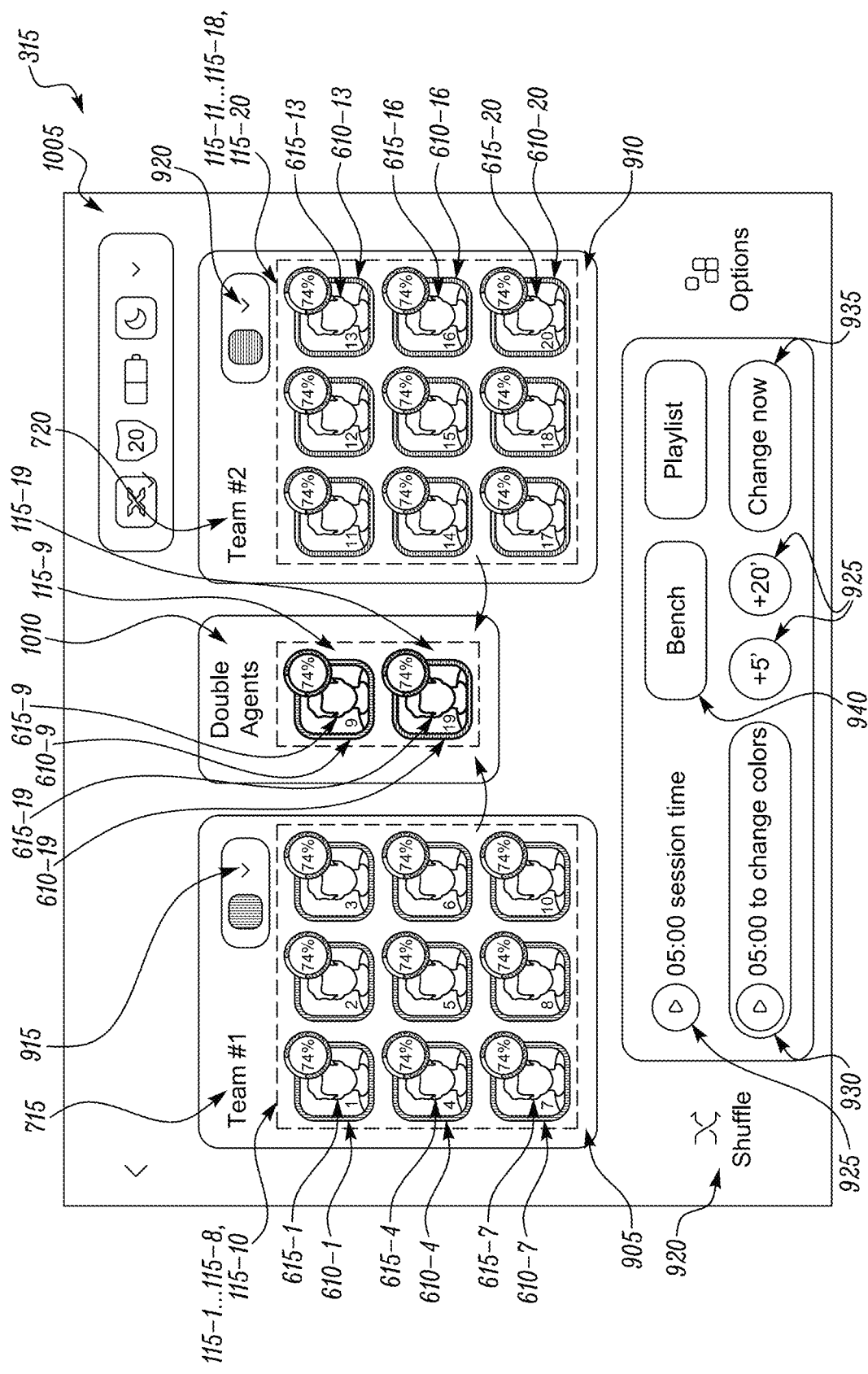
FIG. 10 illustrates an exemplary graphical user interface of the training device of FIG. 3 for conducting a game between two virtual teams with double agents, in accordance with some embodiments.

FIG. 10 illustrates an exemplary double agent session user interface 1005 provided on the training device graphical user interface 315 of the training device of FIG. 3 for conducting a second training session or a second predefined activity during the first training session for the first virtual team 715 or the first subset of players, for example, 615-1 . . . 615-n, the second virtual team 720 or the second subset of players, for example, 615-11 . . . 615-20, and the one or more players associated with wearable devices illuminated in the third color. In an exemplary embodiment, the second training session corresponds to a double agent session or a double agent mode that includes the second predefined activity. In order to begin the second training session or the second predefined activity, the training device 105 is configured to associate the third color with the icons, for example, 610-9, 610-19 representing the players 615-9, 615-19 after a predefined time interval from a starting time of the first predefined activity based on the graphical color change button 930 or based on the instructor/coach input received via the graphical instructor color change button 935. The icons 610-9, 610-19 associated with the third color correspond to a third subset of wearable devices, for example, 115-9, 115-19 associated with the players, for example, 615-9, 615-19. In some embodiments, the training device 105 can also be configured to display a third designated area 1010 on the training device graphical interface 315 and move the icons, for example, 610-9, 610-19 associated with the third color in the third designated area 1010. In some embodiments, the training device 105 can also be configured to associate one or more icons, for example, 610-9, 610-19 with the third color upon movement of the icons from the first designated area 905 or the second designated area 910 to the third designated area 1010 and selection of the third color corresponding the icons, for example, 610-9, 610-19 in the third designated area. The training device 105 is also configured to transmit the training device communication signals to the third subset of wearable devices, for example, 115-9, 115-19 to illuminate the visual indicators, for example, 220-9, 220-19 of the third subset of wearable devices, for example, 115-9, 115-19 associated with the players, for example, 615-9, 615-19 in the third color. The illumination of the visual indicators, for example, 220-9, 220-19 in the third color indicates commencement of the second predefined activity corresponding to the players, for example, 615-9, 615-19 playing for the first virtual team 715 and/or the second virtual team 720 as 'double agents'.

In some embodiments, the third color associated with icons, for example, 610-9, 610-19 representing the players, for example, 615-9, 615-19 can be same as the first color for a first time interval and same as the second color for a second time interval. The first time interval and the second time interval can be predefined or based on instructor/coach input received via the graphical time interval buttons 925. In such embodiments, the illumination of the visual indicator, for example, 220-9, 220-19, in the third color equivalent to the first color indicates a commencement of the players, for example, 615-9, 615-19 playing for the first virtual team 715 during the first time interval. Similarly, the illumination of the visual indicators, for example, 220-9, 220-19, in the third color equivalent to the second color indicates a commencement of the players, for example, 615-9, 615-19, playing for the second virtual team 720 during the second time interval of the training session associated with the first predefined activity. In some embodiments, the second predefined activity corresponds to players, for example, 615-9, 615-19, optionally playing for the first virtual team 715 or the second virtual team 720 during the training session based on a preference of the players during the second training session or the second predefined activity. In such embodiments, the third color is different from the first color and the second color.

In some embodiments, the training device 105 is configured to associate the at least one icon, for example, 610-1, 610-2 of the first subset of icons, for example, 610-1 . . . 610-10 with the third color such that a count of the first subset of icons, for example, 610-3 . . . 610-10 representing the first subset of players, for example, 615-3 . . . 615-10 associated with the first color is different from a count of the icons, for example, 610-1 . . . 610-2 representing the players associated with the third color after the association. In some embodiments, the training device 105 is also configured to associate one or more icons, for example, 610-11, 610-12 of the second subset of icons, for example, 610-11 . . . 610-20 with a fourth color such that a count of the second subset of icons, for example, 610-13 . . . 610-20 representing the second subset of players, for example, 615-13 . . . 615-20 associated with the second color is different from a count of the icons, for example, 610-11, 610-12 representing the players, for example 615-11, 615-12 associated with the fourth color after the association. In such embodiments, the training device 105 is also configured to transmit, via the training device processor 325, one or more training device communication signals to one or more wearable devices, for example, 115-1, 115-2 and 115-11, 115-12 of the plurality of wearable devices, for example, 115-1, 115-2, 115-3 . . . 115-n corresponding to the one or more players, for example, 615-1, 615-2, and 615-11, 615-12 representing the icons, for example, 610-1, 610-2, and 610-11, 610-12 associated with the third color and the fourth color respectively to illuminate the visual indicators, for example, 220-1, 220-2, and 220-11, 220-12 of respective wearable devices, for example, 115-1, 115-2 and 115-11, 115-12 associated with the players, for example, 615-1, 615-2, and 615-11, 615-12 in the third color and the fourth color respectively. In such embodiments, the illumination of the visual indicators, for example, 220-1, 220-2, and 220-11, 220-12 in the third color and the fourth color respectively indicates commencement of the third training session or the third predefined activity. In some embodiments, the third training session or the third predefined activity corresponds to a game to be played between the first subset of players, for example, 615-3 . . . 615-10 associated with the first color and the players, for example, 615-1, 615-2 associated with the third color. In some embodiments, the third training session or the third predefined activity also corresponds to a game to be played between the second subset of players, for example, 615-13 . . . 615-20 associated with the second color and the players, for example, 615-11, 615-12 associated with the fourth color.

Figure 11:
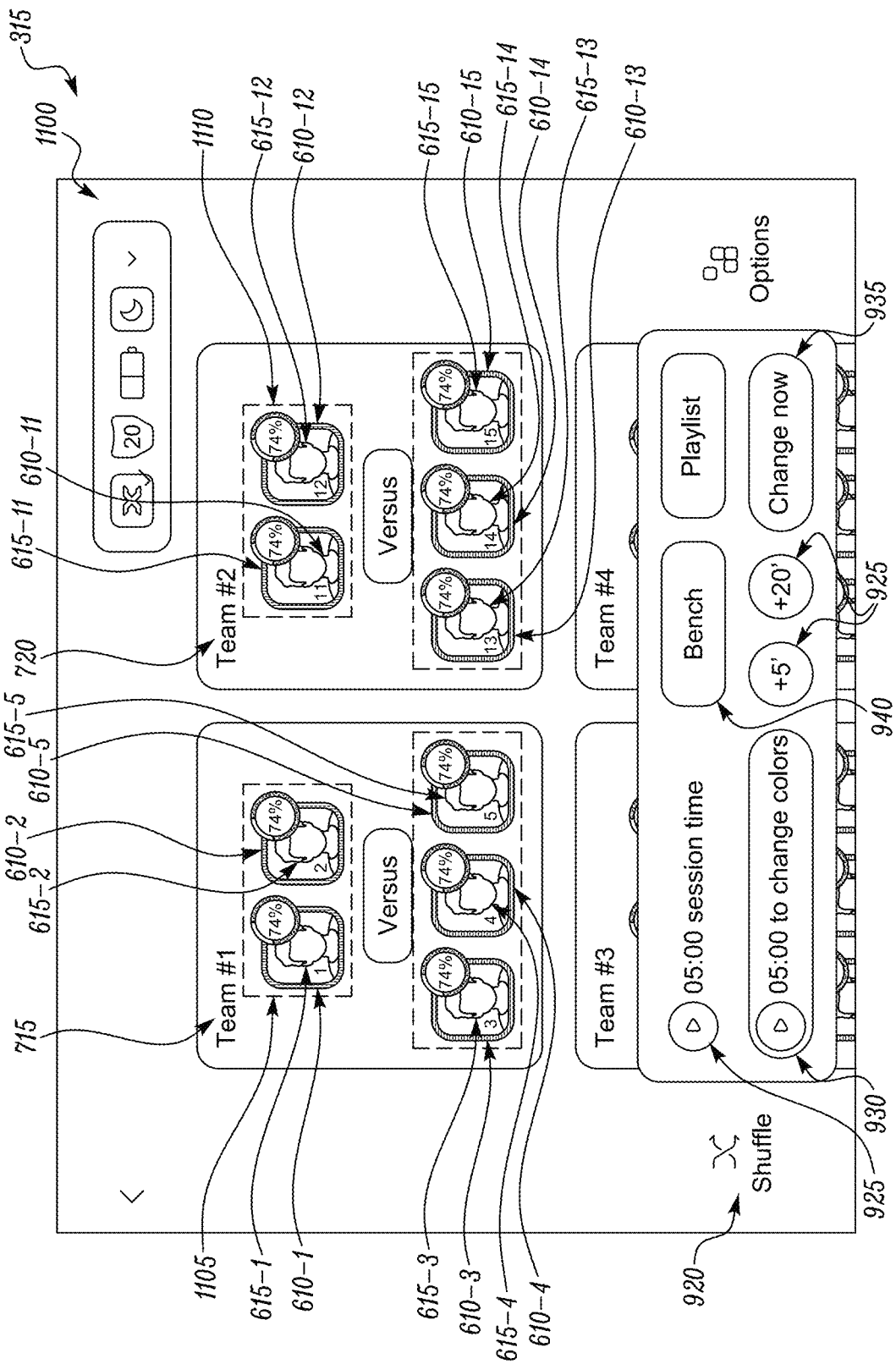
FIG. 11 illustrates an exemplary graphical user interface of the training device of FIG. 3 for conducting a game between two un-balanced virtual teams, in accordance with some embodiments.

FIG. 11 illustrates an exemplary unbalanced team session user interface 1100 provided on the training device graphical user interface 315 of the training device of FIG. 3 for conducting the third training session or the third predefined activity. In some embodiments, the unbalanced team session corresponds to a sporting game, or any other activity played between at least two virtual teams of the virtual teams, for example, 715, 720, 725 (see FIG. 7) or at least two sets of players in each virtual team, for example, 715, 720, having different counts of players of the players, for example, 615-1 . . . 615n (see FIG. 6) in the at least two teams or the at least two sets of players respectively. For example, in some embodiments, the third training session or the third predefined activity is conducted between one or more players, for example, 615-1 . . . 615-2 of the first subset of players, for example, 615-1 . . . 615-10 correspondingly representing one or more icons, for example, 610-1 . . . 610-2 of the first subset of icons, for example, 610-1 . . . 610-10 associated with the first color and a third subset of players, for example, 1105, including the players, for example, 615-3 . . . 615-5, corresponding representing the icons, for example, 610-3, 610-5 associated with the third color. In such embodiments, the third training session or the third predefined activity is also conducted between one or more players, for example, 615-11 . . . 615-12 of the second subset of players representing the icons, for example, 610-11 . . . 610-12 associated with the second color and a fourth subset of players, for example, 1110, including the players, for example, 615-13 . . . 615-15 associated with the fourth color in the second virtual team 720.

In view of the preceding description, it will be apparent to those of ordinary skill in art that training device 105 can be configured to associate a plurality of distinct colors in addition to the first color, the second color, the third color and the fourth color corresponding to an icon of the plurality of icons, for example, 610-1 . . . 610-n or groups of icons, for example, the first subset of icons, for example, 610-1 . . . 610-10 and transmit corresponding training device communication signals to the corresponding wearable devices, for example, 115-1, 115-2, 115-3 . . . 115-n of the players, representing the icons or the group of icons respectively to indicate commencement of a plurality of different predefined activities in the addition to the first predefined activity, the second predefined activity, and/or third predefined activity. It will also be appreciated by those of ordinary skill in art that training device 105 can be configured to associate a plurality of distinct colors in addition to the first color, the second color, the third color, and the fourth color corresponding to a plurality of virtual teams 710 (see FIG. 7) in addition to the first virtual team 715 including the first subset of players, for example, 615-1 . . . 615-10 and the second virtual team 720 including the second subset of players, for example, 615-11 . . . 615-20. The training device 105 is also configured to transmit the corresponding training device communication signals to the wearable devices, for example, 115-1, 115-2, 115-3 . . . 115-n of the players, for example, 615-1 . . . 615-n included in the additional virtual teams of the virtual teams 710 respectively to illuminate the visual indicators 220-1, 220-2, 220-3 . . . 220-n, of the wearable devices, for example, 115-1, 115-2, 115-3 . . . 115-n respectively in the associated colors. In accordance with various embodiments, the training device 105 is also configured to transmit the corresponding training device communication signals to the wearable devices directly via the peer-to-peer network, for example, 120-1 . . . 120-n or via the hub network device 110 and the associated hub network 110-1. In accordance with various embodiments, the illumination of visual indicators, for example, 220-1 . . . 220-n in the associated colors indicates the commencement of the first predefined activity, the second predefined activity or a plurality of different predefined activities between or corresponding to the additional virtual teams. Further, in accordance with various embodiments, the commencement of the predefined activities based on the illuminated colors can be based on an instruction, a communication, and and/or an agreement between the instructor/coach and the players associated with the wearable devices 115-1, 115-2, 115-3 . . . 115-n.

Figure 12:
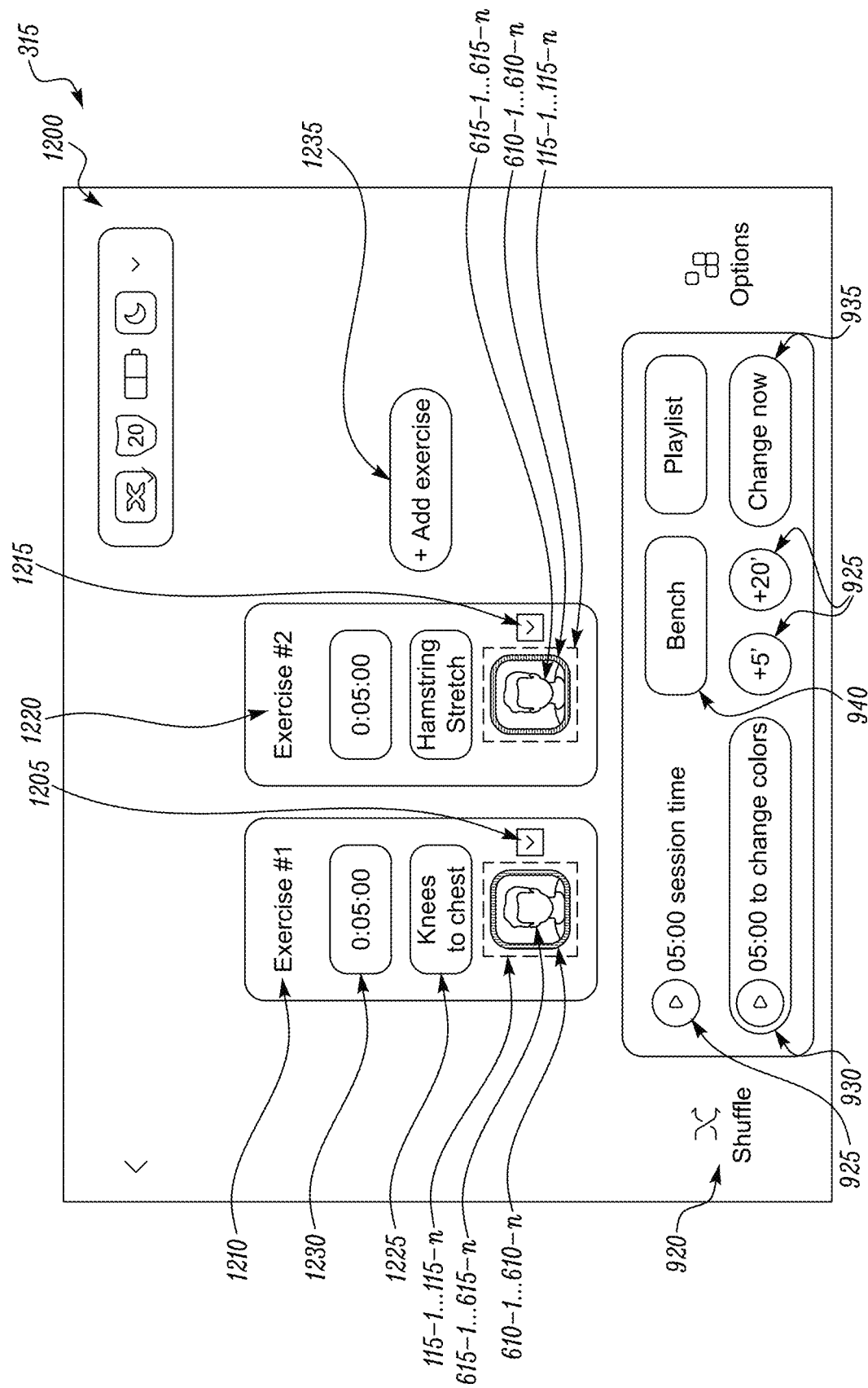
FIG. 12 illustrates an exemplary graphical user interface of the training device of FIG. 3 for conducting an exercise session for players, in accordance with some embodiments.

For example, FIG. 12 illustrates an exemplary warmup session user interface 1200 provided on the training device graphical user interface 315 of the training device of FIG. 3 for conducting a fourth training session or a fourth predefined activity. In some embodiments, the warmup session corresponds to an exercise session, or any other session including a series of exercises or activities to be performed by one or more players, for example, 615-1 . . . 615-n or one or more virtual teams, for example, 715, 720, 725 (see FIG. 7) consecutively. The training device 105 is configured to associate a fifth color 1205 distinct from the first color, second color, the third color, and/or the fourth color with at least one icon, for example, 610-9 (see FIG. 10), or a group of icons, such as, the first subset of icons, for example, 610-1 . . . 610-10 (see FIG. 9), the second subset of icons, for example, 610-11 . . . 610-20 (see FIG. 9), or the icons 610-1 . . . 610-n (see FIG. 6) and transmit a fifth training device communication signal to the corresponding wearable device(s), for example, 115-1 . . . 115-n associated with the players, for example, 615-1 . . . 615-n (see FIG. 6) representing the icons, for example, 610-1 . . . 610-n associated with the first color to illuminate the visual indicators, for example, 220-1 . . . 220-n of the wearable devices, for example, 115-1 . . . 115-n receiving the fifth training device communication signal in the fifth color 1205. In some embodiments, the illumination of the visual indicators, for example, 220-1 . . . 220-n in the fifth color 1205 indicates commencement of the fourth predefined activity by the player/players. In some embodiments, the fourth predefined activity corresponds to a first exercise 1210 to be performed by the player or the players. Similarly, the training device 105 is configured to associate a sixth color 1215 with one or more icons and transmit a sixth signal to the wearable devices, for example, 115-1, 115-2, 115-3 . . . 115-n of players, for example, 615-1 . . . 615-n representing the icons, for example, 610-1 . . . 610-n associated with the sixth color 1215 to indicate commencement of a fifth predefined activity by the player/players. In some embodiments, the fifth predefined activity corresponds to a second exercise 1220 to be performed by the player or the players after the fourth predefined activity or the first exercise 1210. In some embodiments, the training device 105 is configured to receive instructor/coach input, via the training device processor 325, one or more activity parameters associated with the predefined activities, via the training device graphical user interface 315. Examples of the activity parameters include, but are not limited to, activity name 1225, activity duration 1230. In some embodiments, the training device 105 is configured to change the associated color from fifth color 1205 to the sixth color 1215 at predefined time intervals automatically or based on one or more instructor/coach inputs received, via, for example, a graphical color change button 1140 the training device graphical user interface 315. In some embodiments, the training device 105 is also configured to randomly identify, select, and associate one or more icons of the plurality of icons, for example, 610-1 . . . 610-n with one or more colors at the predefined time intervals automatically or based on one or more operator/coach inputs received via the training device graphical user interface 315 or any other input means/mechanism. In some embodiments, the training device 105 is configured to automatically generate and present a sixth predefined activity after the fifth predefined activity to be performed by the players, for example, 615-1 . . . 615-n, or receive the instructor/coach input corresponding to the sixth predefined activity subsequent to the fifth predefined activity via, for example, an add activity button 1235 provided on the training device graphical user interface 315. In such embodiments, the training device 105 is configured to automatically generate the one or predefined activities based on one or more artificial intelligence models and/or the historical data including, but not limited to, previously conducted training sessions and/or predefined activities, and previous player performance evaluated corresponding to the previously conducted training sessions and/or predefined activities.

Figure 13:
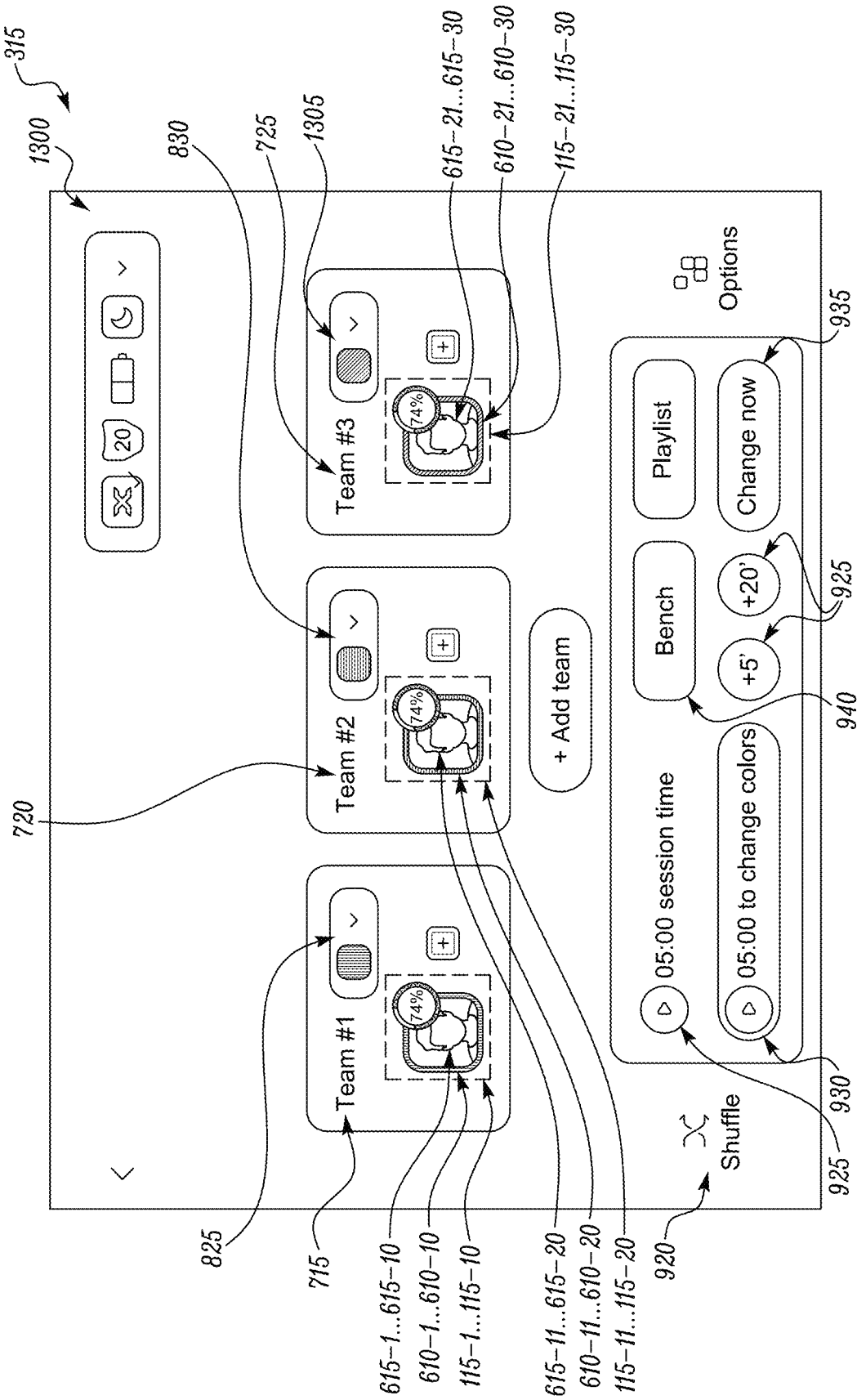
FIG. 13 illustrates an exemplary graphical user interface of the training device of FIG. 3 for conducting a game between two virtual teams, in accordance with some additional embodiments.

In yet another example, FIG. 13 illustrates an exemplary freeplay session user interface 1300 provided on the training device graphical user interface 315 of the training device of FIG. 3 for conducting a seventh training session or a seventh predefined activity. In some embodiments, the freeplay session corresponds to a plurality of predefined activities to be played by the plurality of players, for example, 615-1 . . . 615-n (see FIG. 6) or the plurality of virtual teams, for example, 715, 720, 725 (see FIG. 7) independently. The training device 105 is configured to associate a third virtual team 725 and a third subset of icons, for example, 610-21 . . . 610-30 (see FIG. 6) representing a third sub-set of players, for example, 615-21 . . . 615-30 with a seventh color 1305 and transmit the training device communication signals to the third subset of wearable devices, for example, 115-21 . . . 115-30 associated with the third sub-set of players, for example, 615-21 . . . 615-30 to illuminate the visual indicators, for example, 220-21 . . . 220-30 of the third subset of wearable devices, for example, 115-21 . . . 115-30 respectively in the seventh color 1305. In some embodiments, the illumination of the visual indicators, for example, 220-1 . . . 220-10, 220-11 . . . 220-20, and 220-21 . . . 220-30 in the first color 825, the second color 830, and the seventh color 1305 by the first subset of wearable devices, for example, 115-1 . . . 115-10, the second subset of wearable devices, for example, 115-11 . . . 115-20, and the third subset of wearable devices, for example, 115-21 . . . 115-30 respectively, indicates the commencement of the seventh predefined activity. In some embodiments, the seventh predefined activity is similar to the first predefined activity, and corresponds to, for example, a game to be played between the first subset of players, for example, 615-1 . . . 615-10, the second subset of players, for example, 615-11 . . . 615-20, and the third subset of players, for example, 615-21 . . . 615-30. In some embodiments, the illumination of the visual indicator, for example, 220-1 . . . 220-10, 220-11 . . . 220-20, and 220-21 . . . 220-30, in the first color 825, the second color 830, and the seventh color 1305 by the first subset of wearable devices, for example, 115-1 . . . 115-10, the second subset of wearable devices, for example, 115-11 . . . 115-20, and the third subset of wearable devices, for example, 115-21 . . . 115-30 respectively, indicates the commencement of the eighth predefined activity. In some embodiments, the eighth predefined activity is similar to the second predefined activity, and corresponds to, for example, the third subset of players, for example, 615-21 . . . 615-30 optionally playing for the first virtual team 715 or the second virtual team 720. In some embodiments, the illumination of the visual indicators, for example, 220-21 . . . 220-30 in the seventh color 1305 by the third subset of wearable devices, for example, 115-21 . . . 115-30 corresponds to a ninth predefined activity. In some embodiments, the ninth predefined activity is similar to the fourth predefined activity and corresponds to, for example, the third subset of players, for example, 615-21 . . . 615-30 performing the first exercise 1210 (see FIG. 12).

In some embodiments, the training device 105 is also configured to enable the instructor/coach to evaluate performance of the players, for example, 615-1 . . . 615-n (see FIG. 6) during or after the various training sessions and the predefined activities performed by the players and assign scores corresponding to the players via the training device graphical user interface 315 or any other input means/ mechanism. In such embodiments, the training device 105 is also configured to receive the instructor/coach input related to the scores and display the scores corresponding to the players via, for example, a leaderboard interface (not shown) provided on the training device graphical user interface 315. In some embodiments, the training device 105 is configured to display the leaderboard interface including a list of the players and corresponding scores associated with the players in a descending order of the scores. In some embodiments, the training device 105 is also configured to automatically generate and display the scores corresponding to the players, for example, 615-1 . . . 615-n via the training device graphical user interface 315 based on the evaluation of the players, for example, 615-1 . . . 615-n by the instructor/ coach. In some embodiments, the training device 105 is configured to implement one or more artificial intelligence models or predefined evaluation scoring models to generate the scores.

Figure 14A:
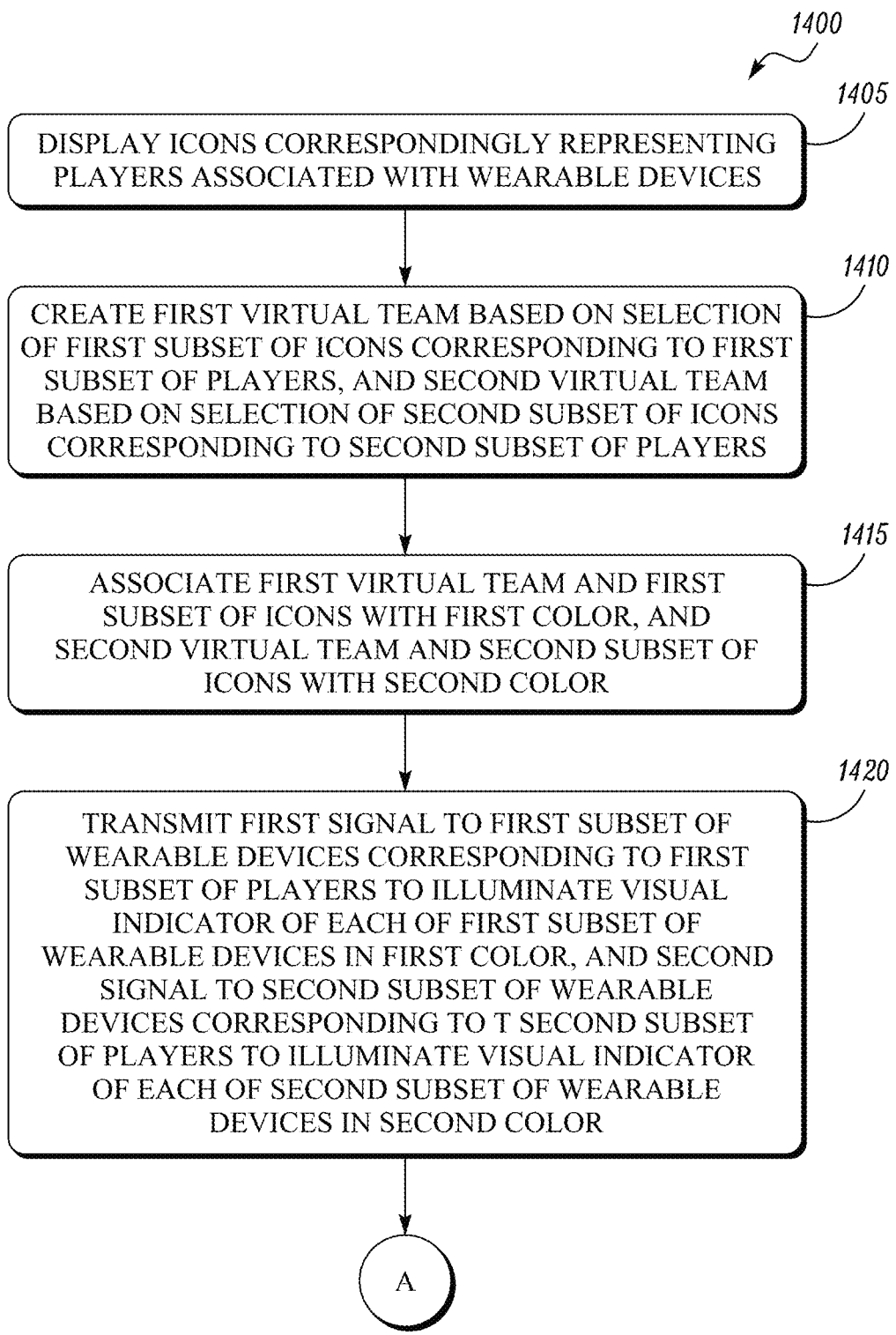
FIGS. 14A through 14B is a flowchart of an exemplary method for conducting a training session for a plurality of players using the training device of FIG. 3, in accordance with some embodiments.
Figure 14B:
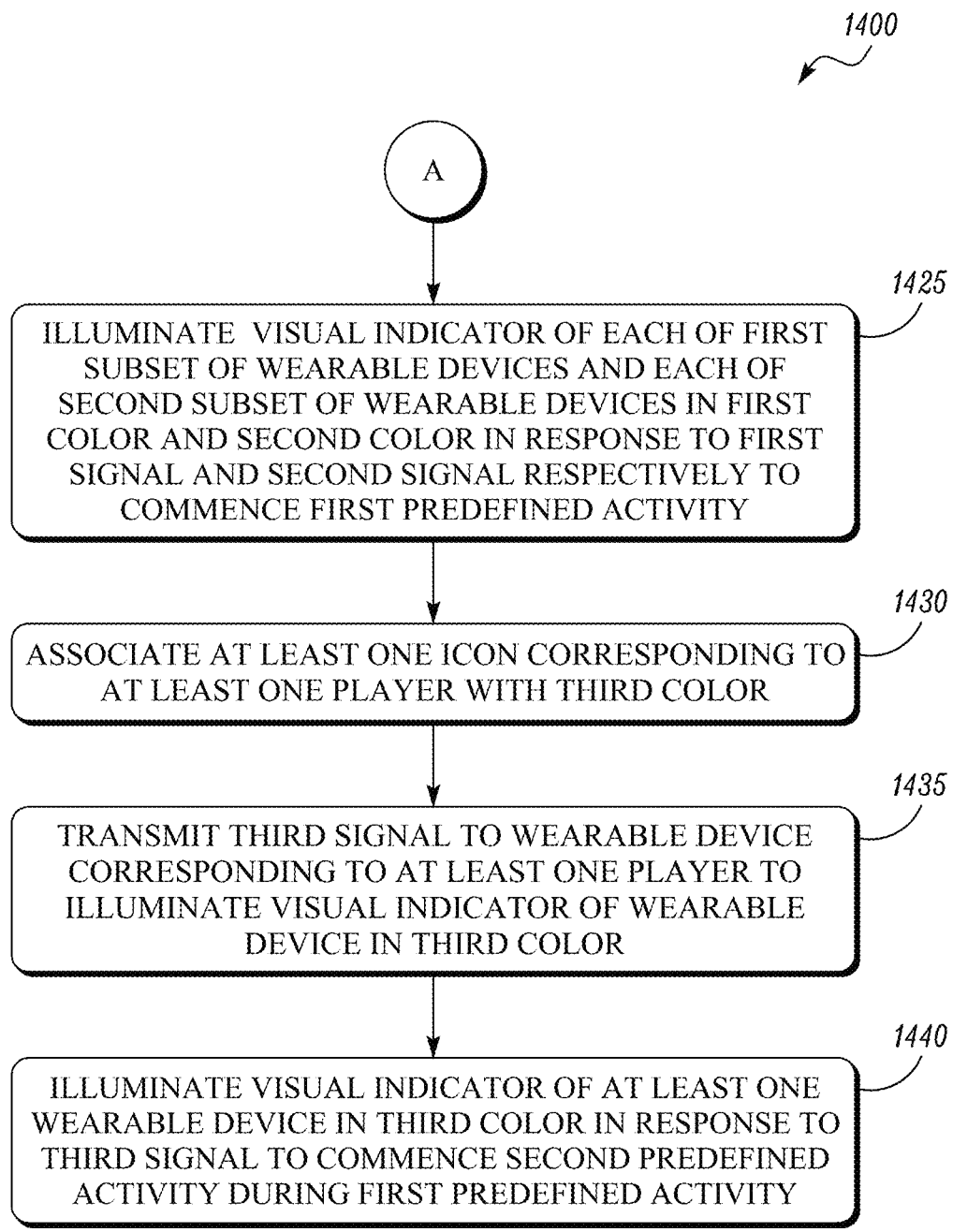

FIGS. 14A through 14B illustrate an exemplary method 1400 for conducting a training session for a plurality of players using the training device 105 of FIG. 3. At operation 1405, the method begins with the training device 105 displaying, via the training device graphical user interface 315, a plurality of icons, for example, 610-1 . . . 610-n (see FIG. 6) correspondingly representing the players, for example, 615-1 . . . 615-n (see FIG. 6) associated with a plurality of wearable devices, for example, 115-1, 115-2, 115-3 . . . 115-n (see FIG. 6). At operation 1410, the training device 105 creates, via the training device processor 325, the first virtual team 715 on the training device graphical user interface 225 based on a selection of the first subset of icons, for example, 610-1 . . . 610-10 of the plurality of icons, for example, 610-1 . . . 610-n corresponding to the first subset of players, for example, 615-1 . . . 615-10 of the plurality of players, for example, 615-1 . . . 615-n. At operation 1410, the training device 105 also creates, via the training device processor 325, a second virtual team 720 on the training device graphical user interface 315 based on a selection of the second subset of icons, for example, 610-11 . . . 610-20 of the plurality of icons, for example, 610-1 . . . 610-n corresponding to the second subset of players, for example, 615-11 . . . 615-20 of the plurality of players, for example, 615-1 . . . 615-n. The first subset of players is different from the second subset of players. At operation 1415, the training device 105 associates, via the training device processor 325, the first virtual team 715 and the first subset of icons, for example, 610-1 . . . 610-10 with the first color 825 (see FIG. 8) based on a selection of the first color 825 via the training device graphical user interface 315. At operation 1415, the training device 105 also associates, via the training device processor 325, the second virtual team 720 and the second subset of icons, for example, 610-11 . . . 610-20 with the second color 830 (see FIG. 8) based on a selection of the second color 830 via the training device graphical user interface 315. At operation 1420, the training device 105 transmits, via the training device processor 325, a first signal to the first subset of wearable devices, for example, 115-1 . . . 115-10 of the plurality of wearable devices, for example, 115-1, 115-2, 115-3 . . . 115-*n* corresponding to the first subset of players 615-1 to illuminate the visual indicators, for example, 220-1 . . . 220-10 of each of the first subset of wearable devices, for example, 115-1 . . . 115-10 in the first color 825. At operation 1420, the training device 105 also transmits, via the training device processor 325, a second signal to the second subset of wearable devices, for example, 115-11 . . . 115-20 of the plurality of wearable devices, for example, 115-1, 115-2, 115-3 . . . 115-*n* corresponding to the second subset of players, for example, 615-11 . . . 615-20 to illuminate the visual indicators, for example, 220-11 . . . 220-20 of each of the second subset of wearable devices, for example, 115-11 . . . 115-20 in the second color 830. At operation 1425, the first subset of wearable devices, for example, 115-1 . . . 115-10 and the first subset of wearable devices, for example, 115-11 . . . 115-20 illuminate the visual indicators 220-1 . . . 220-10 and the visual indicators, for example, 220-11 . . . 220-20 of each of first subset of wearable devices, for example, 115-1 . . . 115-10 and each of second subset of wearable devices, for example, 115-11 . . . 115-20 in the first color 825 and the second color 830 in response to receiving the first training device communication signal and second training device communication signal from the training device 105 respectively to commence the first predefined activity. At operation 1430, the training device 105 associates, via the training device processor 325, at least one icon, for example, 610-9, 610-19 of the plurality of icons, for example, 610-1 . . . 610-*n* corresponding to at least one player, for example, 615-9 with the third color. At operation 1435, the training device 105, transmits, via the training device processor 325, one or more third signals to one or more wearable devices, for example, 115-9, 115-19 corresponding to the players, for example, 615-9, 615-19 to illuminate the visual indicators, for example, 220-9, 220-19 of the wearable devices, for example, 115-9, 115-19 in the third color. At operation 1440, the at least one wearable device, for example, 115-9, 115-19 (see FIG. 9) illuminates the corresponding visual indicators, for example, 220-9, 220-19 of the at least one wearable device, for example, 115-9, 115-19 in the third color in response to receiving the third training device communication signal from the training device 105 to commence a second predefined activity during the first predefined activity.

In view of the foregoing, it will be apparent that the system 100, the training device 105, and method 1300 of the present disclosure, provide an interactive and effective solution to an instructor or a coach for conducting engaging training sessions for the players by involving the players in different teams, different predefined activities, and exercise routines at different time intervals based on visual indicators in real-time. Such various of the training sessions or activities, enable the instructor/coach to improve coordination and agility of the players. The present disclosure also allows the instructors to control the time durations of sessions, introduce activity changes during sessions, and control rest times for the players during or after the training sessions. The present disclosure also enables the instructor or the coach to conduct such training sessions at any given point in time with minimal input by implementing machine learning and/or artificial intelligence models and/or algorithms to automatically conduct the training sessions based on previously conducted training sessions by the instructor/coach. The use of artificial intelligence models also allows the instructor/coach to focus on supervision and evaluation of performance of the players during such sessions rather than manually conducting the sessions each time. Moreover, use of the visual indicators as described in the present disclosure, allows the instructor/coach to visually identify each player and the respective activities being performed by each player during the training sessions and also avoids needless and repeated verbal instructions to be provided to the players to perform the different activities during the training sessions.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that can cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover, in this document, relational terms such as first and second, top and bottom, front and rear, and the like can be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but can include other elements not expressly listed or inherent to such process, method, article, or apparatus. An element preceded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way but can also be configured in ways that are not listed.

It will be appreciated that some embodiments can be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

We claim:

1. A system for conducting a training session for a plurality of players, the system comprising:
   a hub network device;
   a plurality of wearable devices correspondingly associated with the plurality of players, wherein each wearable device of the plurality of wearable devices comprises a visual indicator capable of being illuminated in a plurality of distinct colors; and
   a training device associated with an instructor and in communication with the plurality of wearable devices via the hub network device, wherein the training device is configured to:
   display, via a user interface, a plurality of icons correspondingly representing the plurality of players associated with the plurality of wearable devices;
   automatically create, by a processor of the training device and at least one artificial intelligence model implemented by the processor, a randomized set of virtual teams of the plurality of players on the user interface based on a count of the plurality of wearable devices in communication with the training device via the hub network device;
   generate, by the processor and the at least one artificial intelligence model, a plurality of predefined activities to be performed in a sequence by the created randomized set of virtual teams at different time intervals respectively;
   commence, by the processor and the at least one artificial intelligence model, a first predefined activity of the plurality of generated predefined activities for a first time interval of the time intervals by:
      associating a first virtual team of the randomized set of virtual teams created based on a selection of a first subset of icons of the plurality of icons corresponding to a first subset of players of the plurality of players with a first color of the plurality of distinct colors, and a second virtual team of the randomized set of virtual teams created based on a selection of a second subset of icons of the plurality of icons corresponding to a second subset of players of the plurality of players with a second color of the plurality of distinct colors, and wherein the first subset of players is different from the second subset of players, and
      illuminating, by the processor via the hub network device, the visual indicator of each of a first subset of wearable devices of the plurality of wearable devices in the first color and the visual indicator of each of a second subset of wearable devices with the second color, wherein the training device is configured to illuminate the first subset of wearable devices and the second subset of wearable devices by:
         transmitting, by the processor via the hub network device, a first signal to the first subset of wearable devices corresponding to the first subset of players and a second signal to the second subset of wearable devices corresponding to the second subset of players, wherein the first and second subset of wearable devices are configured to illuminate the visual indicator in the first color and the second color in response to the received first signal and the received second signal respectively, and the illumination of the visual indicator in the first color and the second color indicates commencement of the first predefined activity between the first subset of players and the second subset of players; and
   commence, by the processor and the at least one artificial intelligence model, at least one subsequent predefined activity of the plurality of generated predefined activities for a subsequent time interval of the time intervals after or during the first time interval by:
      associating, by the processor and the at least one artificial intelligence model, at least one icon of the plurality of icons corresponding to at least one player of the plurality of players with at least one color of the plurality of distinct colors, wherein the at least one color associated with each subsequent predefined activity of the at least one subsequent predefined activity is different from each other and is indicative of the at least one subsequent predefined activity; and
      illuminating, by the processor via the hub network device, the visual indicator of at least one wearable device of the plurality of wearable devices in the at least one color, wherein the training device is configured to illuminate the visual indicator of the at least one wearable device in the at least one color by:
         transmitting, by the processor via the hub network device, a third signal to the at least one wearable device corresponding to the at least one player, wherein the at least one wearable device is configured to illuminate the visual indicator in the at least one color in response to the received third signal, and the illumination of the visual indicator in the at least one color indicates commencement of the at least one subsequent predefined activity, that is different from the first predefined activity, by the at least one player.

2. The system of claim 1, wherein the first predefined activity corresponds to a game to be played between the first subset of players and the second subset of players.

3. The system of claim 1, wherein the training device is configured to automatically select, via the at least one artificial intelligence model, the at least one icon from the first subset of icons or the second subset of icons.

4. The system of claim 3, wherein the third color is same as the first color or the second color, and different from a previously associated color of the at least one icon corresponding to the at least one player, and further wherein associating the least one icon corresponding to the at least one player with the third color corresponds to associating the at least one icon with the first subset of icons corresponding to the first subset of players, or the second subset of icons corresponding to the second subset of players, or wherein the third color is different from the first color and the second color, and further wherein associating the least one icon corresponding to the at least one player with the third color corresponds to associating one or more of the first subset of icons or the second subset of icons with the third color.

5. The system of claim 4, wherein the training device is configured to associate the at least one icon with the third color such that a count of the first subset of icons representing the first subset of players is different from a count of the second subset of icons representing the second subset of players after the association.

6. The system of claim 4, wherein the training device is configured to create the first virtual team and the second virtual team by moving the corresponding first subset of icons and the second subset of icons to a first designated area and a second designated area on the user interface respectively based on one or more instructions received via the user interface, and further wherein associating the at least one icon of the plurality of icons with the first subset of icons or the second subset of icons includes moving the at least one icon between the first designated area and the second designated area.

7. The system of claim 1, wherein the second predefined activity corresponds to the at least one player playing for the first virtual team during a first time interval and the second virtual team during a second time interval.

8. The system of claim 1, wherein the at least one artificial intelligence model is trained based on at least one previously conducted training session.

9. The system of claim 1, wherein the training device is configured to randomly select the at least one icon from the plurality of icons and associate the at least one icon with the third color after a predefined period of time from the commencement of the first predefined activity.

10. The system of claim 1, wherein the second predefined activity corresponds to assigning the player to rest or withdraw from the training session.

11. The system of claim 1, wherein the third color indicates feedback or a predefined instruction for the at least one player.

12. A method for conducting a training session for a plurality of players, the method comprising:
displaying, via a user interface of a training device, a plurality of icons correspondingly representing the plurality of players associated with a plurality of wearable devices;
automatically creating, via a processor of the training device, and at least one artificial intelligence model implemented by the processor, a randomized set of virtual teams of the plurality of players on the user interface based on a count of the plurality of wearable devices in communication with the training device via the hub network device;
generating, by the processor and the at least one artificial intelligence model, a plurality of predefined activities to be performed in a sequence by the created randomized set of virtual teams at different time intervals respectively;
commencing, by the processor and the at least one artificial intelligence model, a first predefined activity of the plurality of generated predefined activities for a first time interval of the time intervals by:
associating, via the processor, a first virtual team of the randomized set of virtual teams created based on a selection of a first subset of icons of the plurality of icons corresponding to a first subset of players of the plurality of players with a first color of the plurality of distinct colors, and a second virtual team of the randomized set of virtual teams created based on a selection of a second subset of icons of the plurality of icons corresponding to a second subset of players of the plurality of players with a second color of the plurality of distinct colors, and wherein the first subset of players is different from the second subset of players;
transmitting, via the processor, a first signal to a first subset of wearable devices of the plurality of wearable devices corresponding to the first subset of players to illuminate a visual indicator of each of the first subset of wearable devices in the first color, and a second signal to a second subset of wearable devices of the plurality of wearable devices corresponding to the second subset of players to illuminate the visual indicator of each of the second subset of wearable devices in the second color, wherein the visual indicator is capable of being illuminated in at least three colors and the illumination of the visual indicator in the first color indicates commencement of the first predefined activity between the first subset of players and the second subset of players;
illuminating the visual indicator of each of the first subset of wearable devices and each of the second subset of wearable devices in the first color and the second color in response to the first signal and the second signal respectively to commence the first predefined activity; and
commencing, by the processor and the at least one artificial intelligence model, at least one subsequent predefined activity of the plurality of generated predefined activities for a subsequent time interval of the time intervals after or during the first time interval by:
associating, via the processor and the at least one artificial intelligence model, at least one icon of the plurality of icons corresponding to at least one player of the plurality of players with at least one color plurality of distinct colors, wherein the at least one color associated with each subsequent predefined activity of the at least one subsequent predefined activity is different from each other and is indicative of the at least one subsequent predefined activity; and transmitting, via the processor, a third signal to at least one wearable device of the plurality of wearable devices corresponding to the at least one player to illuminate the visual indicator of the at least one wearable device in the at least one color, wherein the illumination of the visual indicator in the at least one color indicates commencement of the at least one subsequent predefined activity by the at least one player; and illuminating the visual indicator of the at least one wearable device in the at least one color in response to the third signal to commence the at least one subsequent predefined activity, that is different from the first predefined activity, during the first predefined activity.

13. The method of claim 12, wherein the first predefined activity corresponds to a game to be played between the first subset of players and the second subset of players.

14. The method of claim 13, wherein the third color same as the first color or the second color, and different from a previously associated color of the at least one icon corresponding to the at least one player, and further wherein associating the least one icon corresponding to the at least one player with the third color corresponds to associating the at least one icon with the first subset of icons corresponding to the first subset of players, or the second subset of icons corresponding to the second subset of players, or wherein the third color is different from the first color and the second color, and further wherein associating the least one icon corresponding to the at least one player with the third color corresponds to associating one or more of the first subset of icons or the second subset of icons with the third color.

15. The method of claim 14, wherein a count of the first subset of icons representing the first subset of players is different from a count of the second subset of icons representing the second subset of players after the association.

16. The method of claim 12, wherein the second predefined activity corresponds to the at least one player playing for the first virtual team during a first time interval and the second virtual team during a second time interval.

17. The method of claim 12,
wherein the at least one artificial intelligence model is trained based on at least one previously conducted training session.

18. The method of claim 12, further comprising:
randomly selecting, by the processor, the at least one icon from the plurality of icons; and
associating, by the processor, the at least one icon with the third color after a predefined period of time from the commencement of the first predefined activity.

19. The method of claim 12, the second predefined activity corresponds to assigning the at least one player to rest or withdraw from the training session.

20. A training device for conducting a training session for a plurality of players, the training device comprising:
a transceiver in communication with a plurality of wearable devices correspondingly associated with the plurality of players via a hub network device;
a processor; and
a memory for storing instructions, that when executed by the processor, causes the processor to:
display, via a user interface, a plurality of icons correspondingly representing the plurality of players associated with the plurality of wearable devices;
automatically create, via at least one artificial intelligence model implemented by the processor, a randomized set of virtual teams of the plurality of players on the user interface based on a count of the plurality of wearable devices in communication with the training device via the hub network device;
generate, by the processor and the at least one artificial intelligence model, a plurality of predefined activities to be performed in a sequence by the created randomized set of virtual teams at different time intervals respectively;
commence, by the processor and the at least one artificial intelligence model, a first predefined activity of the plurality of generated predefined activities for a first time interval of the time intervals by:
associating a first virtual team of the randomized set of virtual teams created based on a selection of a first subset of icons of the plurality of icons corresponding to a first subset of players of the plurality of players with a first color of the plurality of distinct colors, and a second virtual team of the randomized set of virtual teams created based on a selection of a second subset of icons of the plurality of icons corresponding to a second subset of players of the plurality of players with a second color of the plurality of distinct colors, and wherein the first subset of players is different from the second subset of players;
illuminating, by the processor via the hub network device, a visual indicator of each of a first subset of wearable devices of the plurality of wearable devices in the first color and the visual indicator of each of a second subset of wearable devices with the second color, wherein the visual indicator is capable of being illuminated in at least three colors and the training device is configured to illuminate the visual indicator of each of the first subset of wearable devices and the second subset of wearable devices by:
transmitting, via the hub network device, a first signal to the first subset of wearable devices corresponding to the first subset of players, and a second signal to the second subset of wearable devices corresponding to the second subset of players, wherein the first and second subset of wearable devices are configured to illuminate the visual indicator in the first color and the second color in response to the received first signal and the received second signal respectively, and the illumination of the visual indicator in the first color and the second color indicates commencement of the first predefined activity between the first subset of players and the second subset of players; and
commence, by the processor and the at least one artificial intelligence model, at least one subsequent predefined activity of the plurality of generated predefined activities for a subsequent time interval of the time intervals after or during the first time interval by:
associating, via the at least one artificial intelligence model, at least one icon of the plurality of icons corresponding to at least one player of the plurality of players with at least one color of the of the plurality of distinct colors, wherein the at least one color associated with each subsequent predefined activity of the at least one subsequent predefined activity is different from each other and is indicative of the at least one subsequent predefined activity; and illuminating, by the processor via the hub network device, the visual indicator of at least one wearable device of the plurality of wearable devices in the at least one color, wherein the training device is configured to illuminate the visual indicator of the at least one wearable device in the at least one color by:

transmitting, via the hub network device, a third signal to the at least one wearable device corresponding to the at least one player, wherein the at least one wearable device is configured to illuminate the visual indicator in the at least one color in response to the received third signal, and the illumination of the visual indicator in the at least one color indicates commencement of the at least one subsequent predefined activity, that is different from the first predefined activity, by the at least one player.

* * * * *